United States Patent
Minoguchi et al.

(10) Patent No.: US 12,283,990 B2
(45) Date of Patent: Apr. 22, 2025

(54) OPTICAL COMMUNICATION SYSTEM

(71) Applicant: NIPPON TELEGRAPH AND TELEPHONE CORPORATION, Tokyo (JP)

(72) Inventors: Kyo Minoguchi, Musashino (JP); Toshiaki Shitaba, Musashino (JP); Tomoaki Yoshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 97 days.

(21) Appl. No.: 18/009,600

(22) PCT Filed: Jun. 25, 2020

(86) PCT No.: PCT/JP2020/025071
§ 371 (c)(1),
(2) Date: Dec. 9, 2022

(87) PCT Pub. No.: WO2021/260896
PCT Pub. Date: Dec. 30, 2021

(65) Prior Publication Data
US 2023/0216586 A1 Jul. 6, 2023

(51) Int. Cl.
*H04B 10/2513* (2013.01)
(52) U.S. Cl.
CPC .................. *H04B 10/2513* (2013.01)
(58) Field of Classification Search
CPC .......................................... H04B 10/251–2531
See application file for complete search history.

(56) References Cited

U.S. PATENT DOCUMENTS

| 2002/0003646 A1* | 1/2002 | Ishikawa | H04B 10/2519 398/147 |
| 2002/0061163 A1* | 5/2002 | Bartur | G02B 6/4202 385/24 |

(Continued)

FOREIGN PATENT DOCUMENTS

WO WO-2020/004215 A1 1/2020

OTHER PUBLICATIONS

Lars Gruner-Nielsen et al., "Dispersion-Compensating Fibers", Journal of Lightwave Technology, vol. 23, No. 11, pp. 3566-3579, Nov. 2005.

(Continued)

*Primary Examiner* — Nathan M Cors

(57) ABSTRACT

An optical communication system includes a first optical communication device; a plurality of second optical communication devices configured to perform communication with the first optical communication device; a chromatic dispersion compensation device connected to the first optical communication device; and an optical transmission line connected to the chromatic dispersion compensation device, a path of the optical transmission line connected to the chromatic dispersion compensation device being split into a plurality of paths at a branch point, the resulting paths being respectively connected to the plurality of second optical communication devices, and the optical transmission line being configured to transmit optical signals through the paths, in which the chromatic dispersion compensation device includes a chromatic dispersion compensator configured to perform chromatic dispersion compensation corresponding to amounts of chromatic dispersion generated in optical signals propagated through respective paths between the first optical communication device and the plurality of second optical communication devices.

4 Claims, 9 Drawing Sheets

(56) References Cited

U.S. PATENT DOCUMENTS

| | | | | |
|---|---|---|---|---|
| 2006/0280502 A1* | 12/2006 | Sekine | .................. | H04L 12/66 |
| | | | | 398/71 |
| 2007/0189769 A1* | 8/2007 | Mauro | ................ | H04B 10/272 |
| | | | | 348/E7.094 |
| 2008/0089645 A1* | 4/2008 | Wang | ................ | G02B 6/29395 |
| | | | | 385/37 |
| 2009/0028562 A1* | 1/2009 | Gianordoli | ......... | H04B 10/2972 |
| | | | | 398/61 |
| 2012/0328294 A1* | 12/2012 | Chen | ................ | H04B 10/2525 |
| | | | | 398/66 |
| 2020/0067598 A1* | 2/2020 | Yoshida | ........... | H04B 10/07951 |
| 2021/0266069 A1 | 8/2021 | Masumoto et al. | | |

OTHER PUBLICATIONS

Dispersion Compensation, 2019 Proximion AB, [retrieved on Jun. 4, 2020], Internet (URL: https://www.proximion.com/dispersion-compensation/).

D. van den Borne et al., "Cost-effective 10.7-Gbit/s Long-Haul Transmission using Fiber Bragg Gratings for In-line Dispersion Compensation", in Optical Fiber Communication Conference and Exposition and The National Fiber Optic Engineers Conference, OSA Technical Digest Series (CD) (Optical Society of America, 2007), paper OThS5.

\* cited by examiner

OPTICAL COMMUNICATION SYSTEM

CROSS-REFERENCE TO RELATED APPLICATIONS

This application is a 371 U.S. National Phase of International Application No. PCT/JP2020/025071, filed on Jun. 25, 2020. The entire disclosure of the above application is incorporated herein by reference.

TECHNICAL FIELD

The present invention relates to an optical communication system.

BACKGROUND ART

In optical fiber communication, when an optical signal propagates through an optical fiber, waveform distortion occurs due to the chromatic dispersion effect of the optical fiber. Chromatic dispersion is a phenomenon caused as the propagation speed of an optical signal through an optical fiber differs depending on the wavelength of the signal. Thus, the longer the optical fiber, the greater the influence of chromatic dispersion.

Waveform distortion resulting from chromatic dispersion can be compensated for by using a dispersion compensation fiber (hereinafter referred to as a "DCF") with a chromatic dispersion property opposite to that of an optical fiber of an optical transmission line (for example, see Non-Patent Literature 1).

In recent years, FBG-DCMs (FBG-based continuous Dispersion Compensation Modules) that utilize fiber bragg gratings (hereinafter referred to as "FBGs") have drawn attention as new chromatic dispersion compensation devices (for example, see Non-Patent Literatures 2 and 3). FBG-DCMs are compact compared to DCFs. Hereinafter, an optical device used for chromatic dispersion compensation, such as a DCF or an FBG-DCM, shall be referred to as a chromatic dispersion compensation module (CDCM).

A chromatic dispersion compensation module can suppress degradation of signal quality resulting from chromatic dispersion down to a reference value or less. Thus, the range of the chromatic dispersion that can be compensated for is limited to the range corresponding to the reference value (for example, see Non-Patent Literatures 1 to 3).

CITATION LIST

Non-Patent Literature

Non-Patent Literature 1: Lars Gruner-Nielsen, Marie Wandel, Poul Kristensen, Carsten Jorgensen, Lene Vilbrad Jorgensen, Bent Edvold, Bera Palsdottir, and Dan Jakobsen, "Dispersion-Compensating Fibers", Journal of Lightwave Technology, Vol. 23, No. 11, pp. 3566-3579, November 2005
Non-Patent Literature 2: "Dispersion Compensation", Proximation AB, [searched on Jun. 4, 2020], the Website (URL: https://www.proximion.com/dispersion-compensation/)
Non-Patent Literature 3: D. van den Borne, V. Veljanovski, E. de Man, U. Gaubatz, C. Zuccaro, C. Paquet, Y. Painchaud, S. L. Jansen, E. Gottwald, G. D. Khoe, and H. de Waardt, "Cost-effective 10.7-Gbit/s Long-Haul Transmission using Fiber Bragg Gratings for In-line Dispersion Compensation", in Optical Fiber Communication Conference and Exposition and The National Fiber Optic Engineers Conference, OSA Technical Digest Series (CD) (Optical Society of America, 2007), paper OThS5.

SUMMARY OF THE INVENTION

Technical Problem

An optical communication system that performs multiple access through split fibers, as represented by a PON (Passive Optical Network), splits a single path into a plurality of paths at a branch point to accommodate a plurality of optical communication devices. Therefore, there is no need to provide an optical transmission line for each of the plurality of optical communication devices, which is advantageous.

FIG. 10 is a block diagram illustrating the configuration of an optical communication system 100 as an example of an optical communication system that performs multiple access through split fibers. In the optical communication system 100, a single optical communication device 101 provided in a center station is connected to an optical fiber transmission path 130, and the optical fiber transmission path 130 is connected to one end of an optical splitter 131. The optical splitter 131 is a 1:N optical splitter that splits a path at one end thereof into N paths, and a plurality of optical communication devices 110-1 to 110-N are respectively connected to the N paths. Herein, N is an integer greater than or equal to 2. The optical communication device 101 provided in the center station is called a CU (Centralized Unit), and the optical communication devices 110-1 to 110-N provided at different positions in a dispersed manner are called DUs (Distributed Units).

In the optical communication system that performs multiple access through split fibers like the optical communication system 100, the length of the optical transmission line between the optical communication device 101 as the CU and each of the optical communication devices 110-1 to 110-N as the DU is different. Since the length of each optical transmission line is different, the amount of chromatic dispersion generated in an optical signal transmitted from the optical communication device 101 and received by each of the optical communication devices 110-1 to 110-N is also different. Therefore, the amount of chromatic dispersion compensation that should be performed on the optical signal propagated through a path leading to each of the optical communication devices 110-1 to 110-N from the optical communication device 101 is also different.

To individually perform chromatic dispersion compensation for the optical signal propagated through the path leading to each of the optical communication devices 110-1 to 110-N, a method of configuring an optical communication system 100a illustrated in FIG. 11 is considered, for example. In the optical communication system 100a, chromatic dispersion compensation modules 120-1 to 120-N corresponding to the respective optical communication devices 110-1 to 110-N are inserted on the paths between the respective optical communication devices 110-1 to 110-N and the optical splitter 131.

With the configuration of the optical communication system 100a, each of the chromatic dispersion compensation modules 120-1 to 120-N can individually perform compensation for the amount of chromatic dispersion generated in an optical signal propagated through a path leading to each of the optical communication devices 110-1 to 110-N. However, in the configuration of the optical communication system 100a, the chromatic dispersion compensation modules 120-1 to 120-N should be provided on the side of the DUs that are located at far places in a dispersed manner. Therefore, the cost, such as the labor cost, required for the installation is increased, resulting in an increased overall cost for constructing the optical communication system 100a, which is problematic.

In view of the foregoing, it is an object of the present invention to provide a technique that can improve signal quality while suppressing the cost required for constructing a system.

Means for Solving the Problem

An aspect of the present invention is an optical communication system including a first optical communication device; a plurality of second optical communication devices arranged at different positions from that of the first optical communication device and configured to perform communication with the first optical communication device; a chromatic dispersion compensation device connected to the first optical communication device; and an optical transmission line connected to the chromatic dispersion compensation device, a path of the optical transmission line connected to the chromatic dispersion compensation device being split into a plurality of paths at a branch point, the resulting paths being respectively connected to the plurality of second optical communication devices, and the optical transmission line being configured to transmit optical signals through the paths, in which the chromatic dispersion compensation device includes a chromatic dispersion compensation unit that performs chromatic dispersion compensation corresponding to amounts of chromatic dispersion generated in optical signals propagated through respective paths between the first optical communication device and the plurality of second optical communication devices.

Effects of the Invention

According to the present invention, it is possible to improve signal quality while suppressing the cost required for constructing a system.

DESCRIPTION OF EMBODIMENTS

First Embodiment

Figure 1:
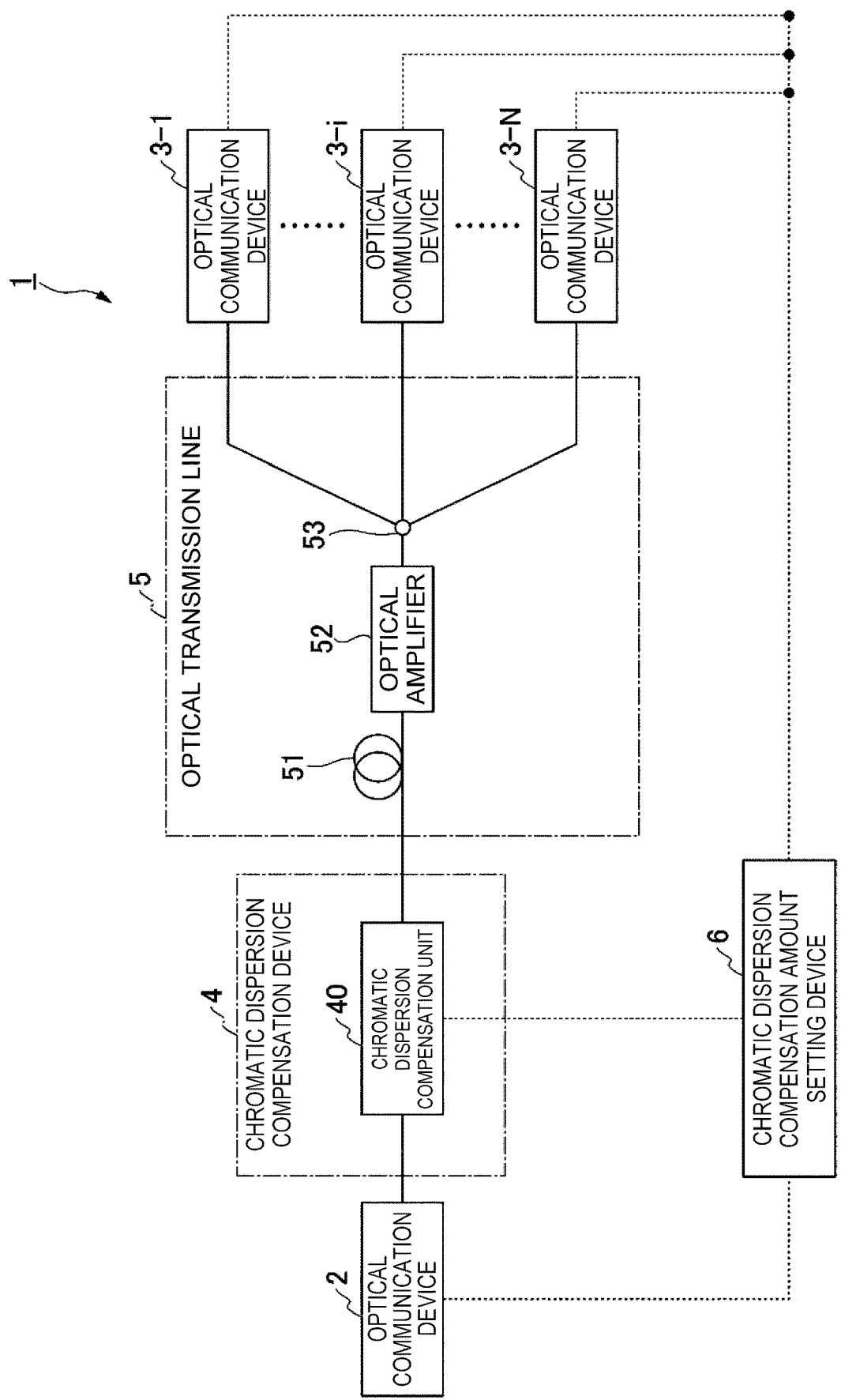
FIG. 1 is a block diagram illustrating the configuration of an optical communication system according to a first embodiment.

Hereinafter, embodiments of the present invention will be described with reference to the drawings. FIG. 1 is a block diagram illustrating the configuration of an optical communication system 1 according to a first embodiment. In FIG. 1, the solid connecting line indicates an optical fiber connection, and the dashed connecting line indicates a communication line provided separately from the solid connecting line.

The optical communication system 1 is an optical communication system that performs multiple access through split fibers. The optical communication system 1 includes an optical communication device 2, N optical communication devices 3-1 to 3-i to 3-N, a chromatic dispersion compensation device (chromatic dispersion compensation apparatus) 4, an optical transmission line 5, and a chromatic dispersion compensation amount setting device 6. Herein, N is an integer greater than or equal to 2, and i is a value of 1 to N. Each of the optical communication devices 3-1 to 3-i to 3-N, which are DUs, is provided in a building of a user of a communication service provided by the optical communication system 1, for example.

Figure 2:
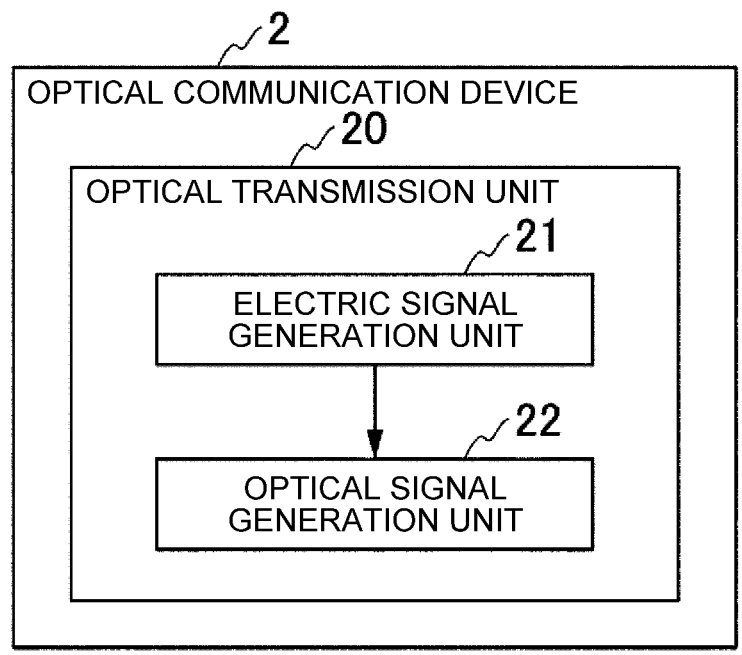
FIG. 2 is a block diagram (No. 1) illustrating the internal configuration of an optical communication device of the first embodiment.

The optical communication device 2 is a CU provided in a building of a center station. The optical communication device 2 includes an optical transmission unit 20 that transmits an optical signal as illustrated in FIG. 2. The optical transmission unit 20 includes an electric signal generation unit 21 and an optical signal generation unit 22. The electric signal generation unit 21 encodes transmission data as an information source, and converts the encoded transmission data into the waveform of an electric signal, thereby generating an electric signal of the transmission data, and then outputs the electric signal. The optical signal generation unit 22 is connected to an optical fiber, and converts the electric signal of the transmission data output from the electric signal generation unit 21 into an optical signal. Then, the optical signal generation unit 22 transmits the resulting optical signal to the optical fiber. The optical signal generation unit 22, upon receiving from the chromatic dispersion compensation amount setting device 6 an instruction signal requesting the transmission of an optical signal for detecting chromatic dispersion, generates a predetermined optical signal for detecting chromatic dispersion, and transmits the signal to the optical fiber.

Figure 3:
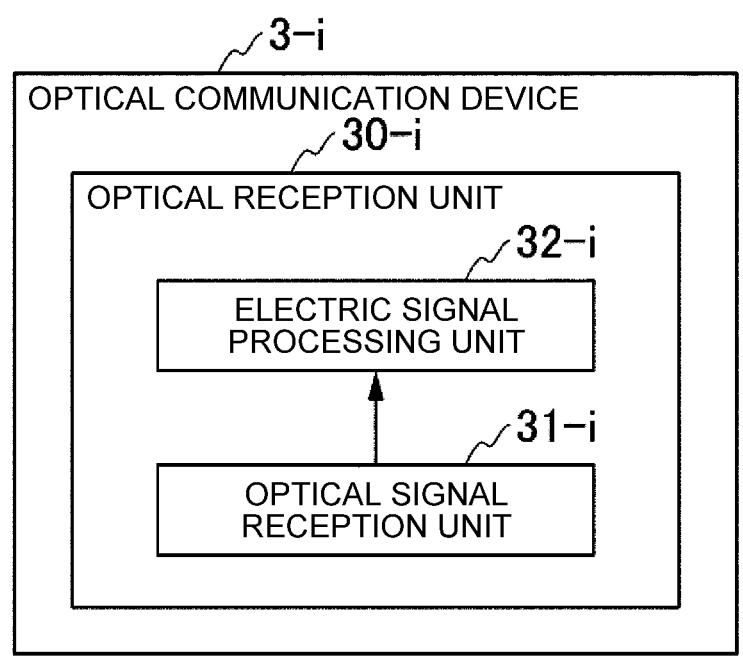
FIG. 3 is a block diagram (No. 2) illustrating the internal configuration of the optical communication device of the first embodiment.

The optical communication devices 3-1 to 3-i to 3-N are the DUs provided at different positions in a dispersed manner. Each of the optical communication devices 3-1 to 3-i to 3-N has the same configuration. FIG. 3 is a block diagram illustrating the internal configuration of the optical communication device 3-i. The optical communication device 3-i includes an optical reception unit 30-i that receives an optical signal. The optical reception unit 30-i includes an optical signal reception unit 31-i and an electric signal processing unit 32-$i$. The optical signal reception unit 31-$i$ receives an optical signal via an optical fiber connected thereto. Then, the optical signal reception unit 31-$i$ converts the received optical signal into an electric signal, and outputs the resulting signal to the electric signal processing unit 32-$i$. The electric signal processing unit 32-$i$ decodes the electric signal output from the optical signal reception unit 31-$i$ to restore the transmission data. In addition, when the optical signal reception unit 31-$i$ has received an optical signal, the electric signal processing unit 32-$i$ transmits to the chromatic dispersion compensation amount setting device 6 information on the optical signal received by the optical signal reception unit 31-$i$. Herein, the information on the optical signal is information on the shape of the waveform of the optical signal, for example.

Referring back to FIG. 1, the optical transmission line 5 accommodates the plurality of optical communication devices 3-1 to 3-N by means of optical fibers branching from the branch point, and transmits an optical signal transmitted from the chromatic dispersion compensation device 4 to the optical communication devices 3-1 to 3-N. The optical transmission line 5 includes an optical fiber transmission path 51, an optical amplifier 52, and an optical divider 53 provided at the branch point. The optical fiber transmission path 51 is an optical signal transmission medium, and is a transmission path with a length over which chromatic dispersion having influence on the signal quality of an optical signal transmitted therethrough is generated.

The optical amplifier 52 amplifies an optical signal. Although FIG. 1 illustrates an example in which the optical amplifier 52 is connected to an end of the optical fiber transmission path 51, the optical amplifier 52 may be provided in an inserted manner on the optical fiber transmission path 51, or devices, such as an optical switch and a regenerative repeater, may be connected to the optical fiber transmission path 51 or be provided in an inserted manner on the optical fiber transmission path 51 other than the optical amplifier 52.

The optical divider 53 is a 1:N optical divider, and splits a path at one end thereof, which is connected to the optical amplifier 52 via an optical fiber, into N paths. The resulting N paths obtained through splitting by the optical divider 53 are connected to the respective optical communication devices 3-1 to 3-N via optical fibers. As the optical divider 53, an optical splitter is applied, for example.

The chromatic dispersion compensation device 4 includes a chromatic dispersion compensation unit (chromatic dispersion compensator) 40. The chromatic dispersion compensation unit 40 includes a plurality of chromatic dispersion compensation modules (CDCMs), such as DCFs or FBG-DCMs, in advance, for example. The plurality of chromatic dispersion compensation modules provide different chromatic dispersion compensation amounts. The chromatic dispersion compensation unit 40 selects a chromatic dispersion compensation module corresponding to the chromatic dispersion compensation amount set by the chromatic dispersion compensation amount setting device 6, and connects the selected chromatic dispersion compensation module to the optical communication device 2 and the optical fiber transmission path 51. Herein, the selection of a chromatic dispersion compensation module corresponding to the chromatic dispersion compensation amount of concern means that if there is a chromatic dispersion compensation module that performs chromatic dispersion compensation corresponding to the chromatic dispersion compensation amount of concern, such a chromatic dispersion compensation module is selected, and if there is no chromatic dispersion compensation module that performs chromatic dispersion compensation corresponding to the chromatic dispersion compensation amount of concern, a chromatic dispersion compensation module that can perform compensation with a chromatic dispersion compensation amount close to the chromatic dispersion compensation amount of concern is selected.

The chromatic dispersion compensation amount setting device (chromatic dispersion compensation amount setting apparatus) 6 is connected to the optical signal generation unit 22 of the optical communication device 2, each of the electric signal processing units 32-1 to 32-N of the optical communication devices 3-1 to 3-N, and the chromatic dispersion compensation unit 40 of the chromatic dispersion compensation device 4 via communication lines indicated by the dashed connecting lines. The chromatic dispersion compensation amount setting device 6 stores in its internal storage area in advance information on an optical signal for detecting chromatic dispersion transmitted from the optical signal generation unit 22 of the optical communication device 2, that is, information on the shape of the waveform of an optical signal for detecting chromatic dispersion that is not influenced by chromatic dispersion.

In calculating the chromatic dispersion compensation amount to be set on the chromatic dispersion compensation unit 40, the chromatic dispersion compensation amount setting device 6 transmits to the optical signal generation unit 22 of the optical communication device 2 an instruction signal requesting the transmission of an optical signal for detecting chromatic dispersion.

When the optical signal reception units 31-1 to 31-N of the optical communication devices 3-1 to 3-N have received optical signals, the chromatic dispersion compensation amount setting device 6 receives information on optical signals transmitted from the electric signal processing units 32-1 to 32-N. The chromatic dispersion compensation amount setting device 6 calculates the amounts Dn (where n=1, 2, . . . , N) of chromatic dispersion generated in the optical signals propagated through the paths leading to the respective optical communication devices 3-1 to 3-N based on the information on the optical signals received from the respective electric signal processing units 32-1 to 32-N influenced by the chromatic dispersion and the information on the optical signal for detecting chromatic dispersion stored in the internal storage area in advance and not influenced by the chromatic dispersion.

The chromatic dispersion compensation amount setting device 6 calculates the chromatic dispersion compensation amount $D_{CDCM}$ to be set on the chromatic dispersion compensation unit 40 based on the N calculated chromatic dispersion amounts $D_1$ to $D_N$. Then, the chromatic dispersion compensation amount setting device 6 sets the calculated chromatic dispersion compensation amount $D_{CDCM}$ on the chromatic dispersion compensation unit 40.

(Process Performed by Optical Communication System of First Embodiment)

Figure 4:
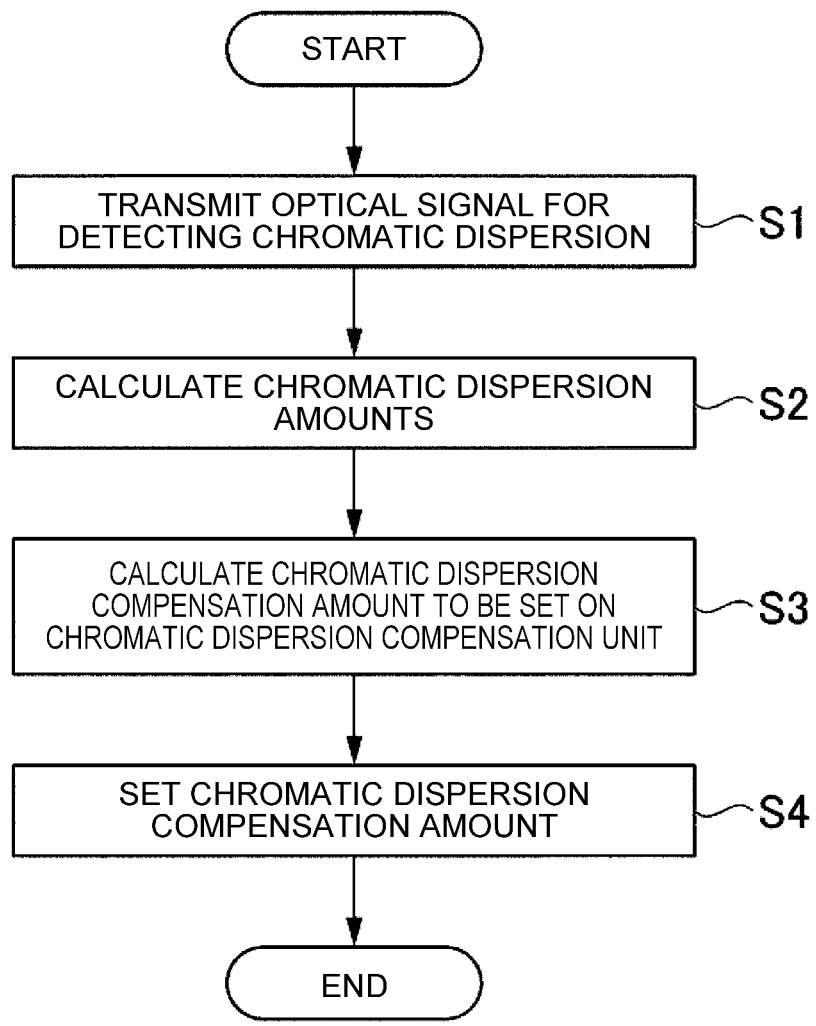
FIG. 4 is a flowchart illustrating a process flow of a chromatic dispersion compensation amount setting device of the first embodiment.

FIG. 4 is a flowchart illustrating a process flow of the chromatic dispersion compensation amount setting device 6. In a state where the chromatic dispersion compensation unit 40 has no chromatic dispersion compensation amount set thereon, and thus does not perform chromatic dispersion compensation, the chromatic dispersion compensation amount setting device 6 transmits to the optical signal generation unit 22 of the optical communication device 2 an instruction signal requesting the transmission of an optical signal for detecting chromatic dispersion (step S1).

Upon receiving the instruction signal from the chromatic dispersion compensation amount setting device 6, the optical signal generation unit 22 of the optical communication device 2 generates a predetermined optical signal for detecting chromatic dispersion, and transmits the signal to the optical fiber. The optical signal transmitted from the optical signal generation unit 22 of the optical communication device 2 reaches the optical divider 53 via the chromatic dispersion compensation unit 40, the optical fiber transmission path 51, and the optical amplifier 52. The optical divider 53 splits the optical signal received at one end thereof into N optical signals. Then, the optical signal reception units 31-1 to 31-N of the respective optical communication devices 3-1 to 3-N receive the N optical signals obtained through splitting by the optical divider 53. Then, the electric signal processing units 32-1 to 32-N transmit to the chromatic dispersion compensation amount setting device 6 information on the optical signals received by the respective optical signal reception units 31-1 to 31-N.

The chromatic dispersion compensation amount setting device 6 calculates the amounts $D_1$ to $D_N$ of chromatic dispersion generated in the optical signals propagated through the paths leading to the respective optical communication devices 3-1 to 3-N from the optical communication device 2 based on the information on the optical signals received from the respective electric signal processing units 32-1 to 32-N influenced by the chromatic dispersion and the information on the optical signal for detecting chromatic dispersion stored in the internal storage area in advance and not influenced by the chromatic dispersion (step S2).

The chromatic dispersion compensation amount setting device 6 calculates the chromatic dispersion compensation amount $D_{CDCM}$ to be set on the chromatic dispersion compensation unit 40 based on the N calculated chromatic dispersion amounts $D_1$ to $D_N$ (step S3). For example, the chromatic dispersion compensation amount setting device 6 calculates the average value of the N chromatic dispersion amounts $D_1$ to $D_N$ as the chromatic dispersion compensation amount $D_{CDCM}$. Then, the chromatic dispersion compensation amount setting device 6 sets the calculated chromatic dispersion compensation amount $D_{CDCM}$ on the chromatic dispersion compensation unit 40 (step S4). Then, the chromatic dispersion compensation unit 40 selects a chromatic dispersion compensation module corresponding to the chromatic dispersion compensation amount $D_{CDCM}$ set by the chromatic dispersion compensation amount setting device 6, and connects the selected chromatic dispersion compensation module to the optical communication device 2 and the optical fiber transmission path 51. Through such a process, an appropriate chromatic dispersion compensation module for performing compensation with the chromatic dispersion compensation amount $D_{CDCM}$ is connected to the optical communication device 2 and the optical fiber transmission path 51.

In such a state, the optical communication device 2 starts transmission of transmission data to the optical communication devices 3-1 to 3-N. That is, the electric signal generation unit 21 of the optical communication device 2 encodes transmission data as an information source, and converts the encoded transmission data into the waveform of an electric signal, thereby generating an electric signal of the transmission data, and then outputs the electric signal to the optical signal generation unit 22. The optical signal generation unit 22 converts the electric signal into an optical signal. Then, the optical signal generation unit 22 transmits the resulting optical signal to the optical fiber.

The chromatic dispersion compensation unit 40 of the chromatic dispersion compensation device 4, upon receiving the optical signal transmitted from the optical signal generation unit 22 of the optical communication device 2, performs chromatic dispersion compensation for the received optical signal based on the chromatic dispersion compensation amount $D_{CDCM}$. Then, the chromatic dispersion compensation unit 40 transmits the optical signal subjected to the chromatic dispersion compensation to the optical transmission line 5. The optical fiber transmission path 51 of the optical transmission line 5 transmits the optical signal transmitted from the chromatic dispersion compensation unit 40, and the optical amplifier 52 amplifies the optical signal transmitted from the optical fiber transmission path 51. The optical divider 53 splits the optical signal transmitted from the optical amplifier 52 into N optical signals, and transmits the resulting N optical signals to the optical fibers leading to the respective optical communication devices 3-1 to 3-N.

The optical signal reception units 31-1 to 31-N of the respective optical communication devices 3-1 to 3-N receive the optical signals, which have been obtained through splitting by the optical divider 53, through the optical fibers. The optical signal reception units 31-1 to 31-N respectively convert the received optical signals into electric signals. Then, the optical signal reception units 31-1 to 31-N respectively output the resulting electric signals to the corresponding electric signal processing units 32-1 to 32-N. The electric signal processing units 32-1 to 32-N capture the electric signals, and decode the captured electric signals to restore the transmission data.

The optical communication system 1 of the aforementioned first embodiment includes the optical communication device 2 as a first optical communication device (first optical communication apparatus), the optical communication devices 3-1 to 3-N as second optical communication devices (second optical communication apparatuses), the chromatic dispersion compensation device 4 connected to the optical communication device 2, and the optical transmission line 5. The optical transmission line 5 is connected to the chromatic dispersion compensation device 4, and the path of the optical transmission line 5 connected to the chromatic dispersion compensation device 4 is split into a plurality of paths at the branch point, so that the resulting paths are connected to the respective optical communication devices 3-1 to 3-N, and optical signals are transmitted through the paths. The chromatic dispersion compensation device 4 includes a single chromatic dispersion compensation unit 40, and the chromatic dispersion compensation unit 40 performs compensation based on, as the chromatic dispersion compensation amount DCDCM, the average value of the amounts D1 to DN of chromatic dispersion generated in the optical signals propagated through the paths leading to the respective optical communication devices 3-1 to 3-N from the optical communication device 2, for example.

Accordingly, the optical communication devices 3-1 to 3-N can receive the optical signals propagated through the paths leading to the respective optical communication devices 3-1 to 3-N with the amounts $D_1$ to $D_N$ of chromatic dispersion generated therein compensated for based on the chromatic dispersion compensation amount $D_{CDCM}$. In the optical communication system 1, since the chromatic dispersion compensation device 4 is connected to the optical communication device 2 as the CU, the chromatic dispersion compensation device 4 can be provided around the optical communication device 2, such as in the building of the center station, for example. Therefore, for the optical communication system 1, there is no need to dispatch a person to the positions where the DUs are provided, for performing chromatic dispersion compensation like the optical communication system 100a illustrated in FIG. 11.

With the chromatic dispersion compensation amount setting device 6, it is possible to, without requiring human labor, set on the chromatic dispersion compensation unit 40 the chromatic dispersion compensation amount $D_{CDCM}$ corresponding to the N amounts $D_1$ to $D_N$ of chromatic dispersion generated in the optical signals propagated through the paths leading to the respective optical communication devices 3-1 to 3-N from the optical communication device 2.

Not as many chromatic dispersion compensation units 40 as the optical communication devices 3-1 to 3-N are provided, but only a single chromatic dispersion compensation unit 40 is used so that chromatic dispersion compensation can be performed with less facilities. Thus, the optical communication system 1 according to the first embodiment can improve signal quality by performing chromatic dispersion compensation while suppressing the cost required for constructing the system, such as the labor cost and the facility cost.

Although the chromatic dispersion compensation amount setting device 6 of the aforementioned first embodiment calculates as the chromatic dispersion compensation amount $D_{CDCM}$ the average value of the N chromatic dispersion amounts $D_1$ to $D_N$, for example, it is also possible to calculate as the chromatic dispersion compensation amount $D_{CDCM}$ an index value indicating properties other than the average value obtained with the N chromatic dispersion amounts $D_1$ to $D_N$.

As described above, the chromatic dispersion compensation unit 40 can suppress degradation of signal quality resulting from chromatic dispersion down to a reference value or less. Thus, the range of the chromatic dispersion that can be compensated for is limited to the range corresponding to the reference value. Therefore, the optical communication device 2 and each of the optical communication devices 3-1 to 3-N should be selected to allow the amount of chromatic dispersion generated between the optical communication device 2 and each of the optical communication devices 3-1 to 3-N to be within the range of the chromatic dispersion compensation amount of the chromatic dispersion compensation unit 40.

Second Embodiment

Figure 5:
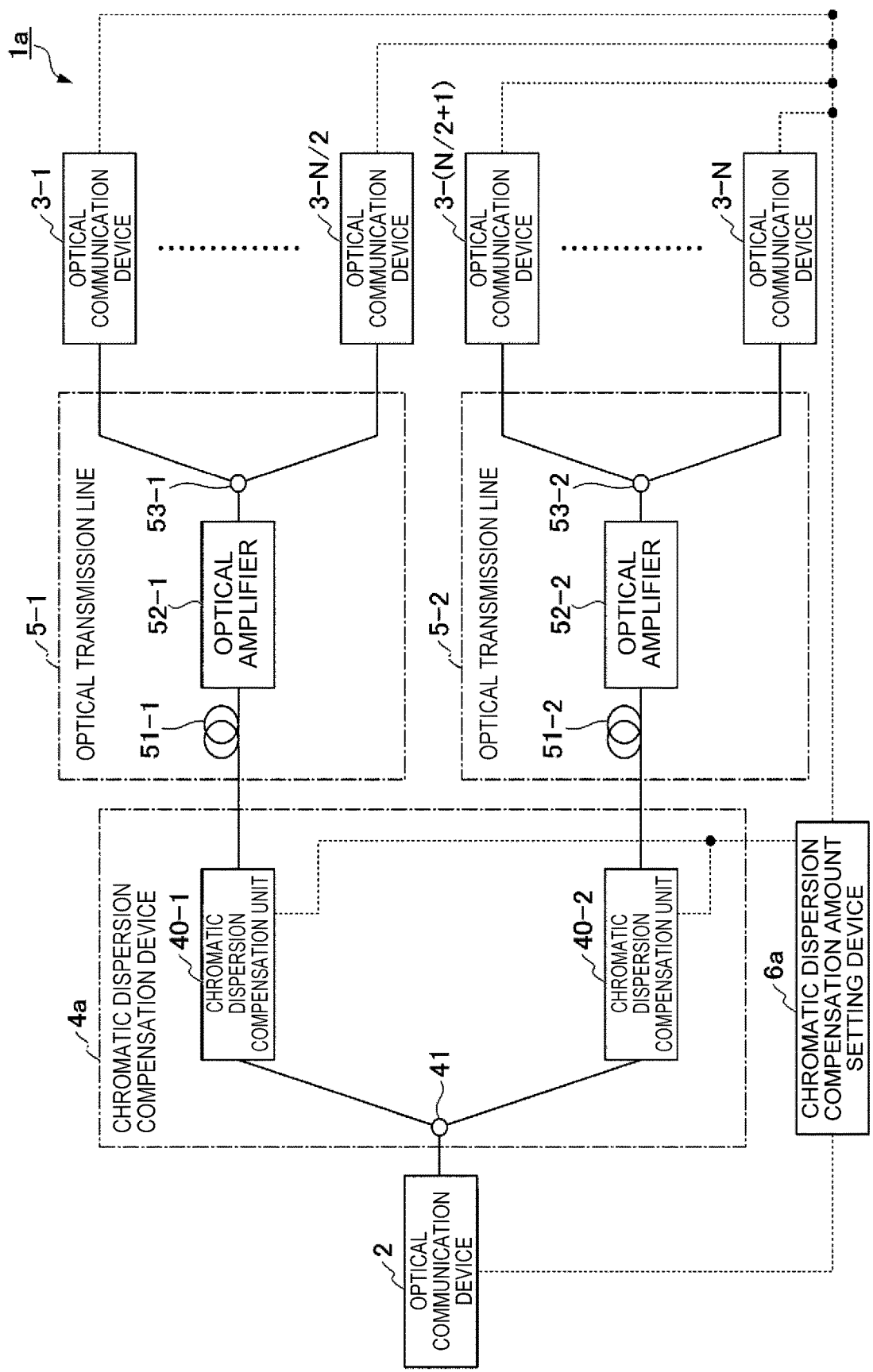
FIG. 5 is a block diagram illustrating the configuration of an optical communication system according to a second embodiment.

FIG. 5 is a block diagram illustrating the configuration of an optical communication system Ta according to a second embodiment. In FIG. 5, configurations identical to those of the first embodiment are denoted by identical reference signs, and different configurations will be described hereinafter. The optical communication system 1a includes an optical communication device 2, optical communication devices 3-1 to 3-N, a chromatic dispersion compensation device 4a, optical transmission lines 5-1 and 5-2, and a chromatic dispersion compensation amount setting device 6a.

In the optical communication system 1 of the first embodiment, the average value of the amounts $D_1$ to $D_N$ of chromatic dispersion generated in the optical signals propagated through the paths leading to the respective optical communication devices 3-1 to 3-N from the optical communication device 2 is used as the chromatic dispersion compensation amount $D_{CDCM}$ to be set on the chromatic dispersion compensation unit 40. In a state where there is not large variation among the distances between the optical communication device 2 and each of the optical communication devices 3-1 to 3-N, variation among the chromatic dispersion amounts $D_1$ to $D_N$ is not large, either. Thus, applying the optical communication system 1 of the first embodiment and using the average value of the chromatic dispersion amounts $D_1$ to $D_N$ as the chromatic dispersion compensation amount $D_{CDCM}$ can perform effective chromatic dispersion compensation for the optical signals transmitted from the optical communication device 2 and received by the optical communication devices 3-1 to 3-N.

In contrast, when there is large variation among the distances between the optical communication device 2 and each of the optical communication devices 3-1 to 3-N, for example, it is assumed that sufficient chromatic dispersion compensation cannot be performed with just a single chromatic dispersion compensation unit 40.

Based on the assumption of such a case, in the optical communication system 1a of the second embodiment, the optical communication devices 3-1 to 3-N are divided into two groups so that appropriate chromatic dispersion compensation is performed for each group, for example. In the example illustrated in FIG. 5, it is assumed that N indicates an even number, and the optical communication devices 3-1 to 3-N are divided into two groups including a group of optical communication devices 3-1 to 3-N/2 and a group of optical communication devices 3-(N/2+1) to 3-N so that each group includes the same number of optical communication devices. The criterion for dividing the optical communication devices into groups is the distance from the optical communication device 2, for example. Specifically, a distance to serve as a criterion is set in advance. Then, the optical communication devices 3-1 to 3-N/2 belong to a group of optical communication devices provided at positions where the distance is less than or equal to the criterion, while the optical communication devices 3-(N/2+1) to 3-N belong to a group of optical communication devices provided at positions where the distance is greater than the criterion.

The chromatic dispersion compensation device 4a includes an optical divider 41 and chromatic dispersion compensation units 40-1 and 40-2. The optical divider 41 is a 1:2 optical divider, and splits a path at one end thereof, which is connected to the optical communication device 2 via an optical fiber, into two paths. The resulting two paths obtained through splitting by the optical divider 41 are respectively connected to the chromatic dispersion compensation units 40-1 and 40-2. As the optical divider 41, an optical splitter is applied, for example.

The chromatic dispersion compensation units 40-1 and 40-2 have the same configuration as the chromatic dispersion compensation unit 40 of the first embodiment, and respectively select chromatic dispersion compensation modules corresponding to chromatic dispersion compensation amounts $D_{CDCM\ \#1}$ and $D_{CDCM\ \#2}$ set thereon by the chromatic dispersion compensation amount setting device 6a, thereby performing chromatic dispersion compensation for optical signals received by the respective chromatic dispersion compensation units 40-1 and 40-2. The chromatic dispersion compensation unit 40-1 is connected to the optical transmission line 5-1 via an optical fiber, and the chromatic dispersion compensation unit 40-2 is connected to the optical transmission line 5-2 via an optical fiber.

The optical transmission lines 5-1 and 5-2 have the same configuration as the optical transmission line 5 of the first embodiment except for the following point. The optical divider 53 of the optical transmission line 5 of the first embodiment is a 1:N optical divider. In contrast, each of optical dividers 53-1 and 53-2 of the optical transmission lines 5-1 and 5-2 is a 1:N/2 optical divider. That is, each of the optical dividers 53-1 and 53-2 is configured to split a path at one end thereof, which is connected to the optical amplifier 52-1 or 52-2 via an optical fiber, into N/2 paths. The resulting N/2 paths obtained through splitting by the optical divider 53-1 are respectively connected to the optical communication devices 3-1 to 3-N/2 via optical fibers. The resulting N/2 paths obtained through splitting by the optical divider 53-2 are respectively connected to the optical communication devices 3-(N/2+1) to 3-N via optical fibers.

The chromatic dispersion compensation amount setting device 6a has the same configuration as the first chromatic dispersion compensation amount setting device 6 except for the following point. The first chromatic dispersion compensation amount setting device 6 is connected to the chromatic dispersion compensation unit 40 via a communication line, whereas the chromatic dispersion compensation amount setting device 6a is connected to each of the chromatic dispersion compensation units 40-1 and 40-2 via a communication line.

The chromatic dispersion compensation amount setting device 6 of the first embodiment calculates the chromatic dispersion compensation amount $D_{CDCM}$ to be set on the chromatic dispersion compensation unit 40 based on the N calculated chromatic dispersion amounts $D_1$ to $D_N$. Then, the chromatic dispersion compensation amount setting device 6 sets the calculated chromatic dispersion compensation amount $D_{CDCM}$ on the chromatic dispersion compensation unit 40. In contrast, the chromatic dispersion compensation amount setting device 6a calculates the chromatic dispersion compensation amount $D_{CDCM\ \#1}$ to be set on the chromatic dispersion compensation unit 40-1 based on the N/2 chromatic dispersion amounts $D_n$ (where n=1, 2, ..., N/2). In addition, the chromatic dispersion compensation amount setting device 6a calculates the chromatic dispersion compensation amount $D_{CDCM\ \#2}$ to be set on the chromatic dispersion compensation unit 40-2 based on the N/2 chromatic dispersion amounts $D_n$ (where n=(N/2+1), (N/2+2), ..., N).

(Process Performed by Optical Communication System of Second Embodiment)

Figure 6:
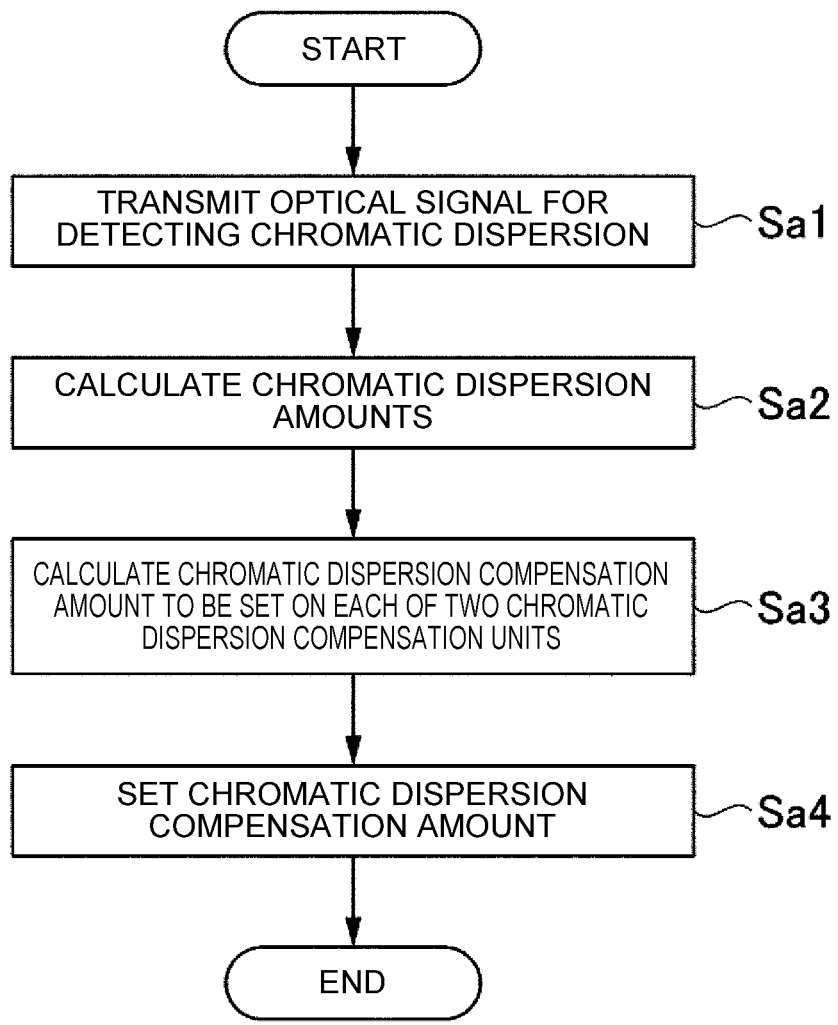
FIG. 6 is flowchart illustrating a process flow of a chromatic dispersion compensation amount setting device of the second embodiment.

FIG. 6 is flowchart illustrating a process flow of the chromatic dispersion compensation amount setting device 6a. In a state where each of the chromatic dispersion compensation units 40-1 and 40-2 has no chromatic dispersion compensation amount set thereon, and thus does not perform chromatic dispersion compensation, the chromatic dispersion compensation amount setting device 6a transmits to the optical signal generation unit 22 of the optical communication device 2 an instruction signal requesting the transmission of an optical signal for detecting chromatic dispersion (step Sa1).

Upon receiving the instruction signal from the chromatic dispersion compensation amount setting device 6a, the optical signal generation unit 22 of the optical communication device 2 generates a predetermined optical signal for detecting chromatic dispersion, and transmits the signal to an optical fiber. The optical divider 41 of the chromatic dispersion compensation device 4a splits the optical signal transmitted from the optical signal generation unit 22 of the optical communication device 2 into two optical signals.

One of the optical signals obtained through splitting by the optical divider 41 reaches the optical divider 53-1 via the chromatic dispersion compensation unit 40-1, an optical fiber transmission path 51-1, and the optical amplifier 52-1.

The optical divider 53-1 splits the optical signal received at one end thereof into N/2 optical signals. Then, optical signal reception units 31-1 to 31-N/2 of the respective optical communication devices 3-1 to 3-N/2 receive the N/2 optical signals obtained through splitting by the optical divider 53-1. Then, electric signal processing units 32-1 to 32-N/2 transmit to the chromatic dispersion compensation amount setting device 6a information on the optical signals received by the respective optical signal reception units 31-1 to 31-N/2.

The other optical signal obtained through splitting by the optical divider 41 reaches the optical divider 53-2 via the chromatic dispersion compensation unit 40-2, an optical fiber transmission path 51-2, and the optical amplifier 52-2. The optical divider 53-2 splits the optical signal received at one end thereof into N/2 optical signals. Then, optical signal reception units 31-(N/2+1) to 31-N of the respective optical communication devices 3-(N/2+1) to 3-N receive the N/2 optical signals obtained through splitting by the optical divider 53-2. Then, electric signal processing units 32-(N/2+1) to 32-N transmit to the chromatic dispersion compensation amount setting device 6a information on the optical signals received by the respective optical signal reception units 31-(N/2+1) to 31-N.

The chromatic dispersion compensation amount setting device 6a calculates the amounts $D_1$ to $D_N$ of chromatic dispersion generated in the optical signals propagated through the paths leading to the respective optical communication devices 3-1 to 3-N based on the information on the optical signals received from the respective electric signal processing units 32-1 to 32-N influenced by the chromatic dispersion and the information on the optical signal for detecting chromatic dispersion stored in an internal storage area in advance and not influenced by the chromatic dispersion (step Sa2).

The chromatic dispersion compensation amount setting device 6a calculates the chromatic dispersion compensation amount $D_{CDCM\ \#1}$ to be set on the chromatic dispersion compensation unit 40-1 based on the N/2 chromatic dispersion amounts $D_n$ (where n=1, 2, ..., N/2). In addition, the chromatic dispersion compensation amount setting device 6a calculates the chromatic dispersion compensation amount $D_{CDCM\ \#2}$ to be set on the chromatic dispersion compensation unit 40-2 based on the N/2 chromatic dispersion amounts $D_n$ (where n=(N/2+1), (N/2+2), ..., N) (step Sa3). For example, the chromatic dispersion compensation amount setting device 6a calculates the average value of the chromatic dispersion amounts $D_1$ to $D_N$ as the chromatic dispersion compensation amount $D_{CDCM\ \#1}$, and calculates the average value of the chromatic dispersion amounts $D_{N/2+1}$ to $D_N$ as the chromatic dispersion compensation amount $D_{CDCM\ \#2}$.

The chromatic dispersion compensation amount setting device 6a sets the calculated chromatic dispersion compensation amount $D_{CDCM\ \#1}$ on the chromatic dispersion compensation unit 40-1, and sets the calculated chromatic dispersion compensation amount $D_{CDCM\ \#2}$ on the chromatic dispersion compensation unit 40-2 (step Sa4). The chromatic dispersion compensation unit 40-1 selects a chromatic dispersion compensation module corresponding to the chromatic dispersion compensation amount $D_{CDCM\ \#1}$ set by the chromatic dispersion compensation amount setting device 6a, and connects the selected chromatic dispersion compensation module to the optical communication device 2 and the optical fiber transmission path 51-1. The chromatic dispersion compensation unit 40-2 selects a chromatic dispersion compensation module corresponding to the chromatic dispersion compensation amount $D_{CDCM\ \#2}$ set by the chromatic dispersion compensation amount setting device 6a, and connects the selected chromatic dispersion compensation module to the optical communication device 2 and the optical fiber transmission path 51-2.

In such a state, the optical communication device 2 starts transmission of transmission data to the optical communication devices 3-1 to 3-N. That is, the electric signal generation unit 21 of the optical communication device 2 encodes transmission data as an information source, and converts the encoded transmission data into the waveform of an electric signal, thereby generating an electric signal of the transmission data, and then outputs the electric signal to the optical signal generation unit 22. The optical signal generation unit 22 converts the electric signal into an optical signal. Then, the optical signal generation unit 22 transmits the resulting optical signal to the optical fiber. The optical divider 41 of the chromatic dispersion compensation device 4a splits the optical signal transmitted from the optical signal generation unit 22 of the optical communication device 2 into two optical signals.

The chromatic dispersion compensation unit 40-1 of the chromatic dispersion compensation device 4a, upon receiving one of the optical signals obtained through splitting by the optical divider 41, performs chromatic dispersion compensation for the received optical signal based on the chromatic dispersion compensation amount $D_{CDCM\ \#1}$. Then, the chromatic dispersion compensation unit 40-1 transmits the optical signal subjected to the chromatic dispersion compensation to the optical transmission line 5-1.

The chromatic dispersion compensation unit 40-2 of the chromatic dispersion compensation device 4a, upon receiving the other optical signal obtained through splitting by the optical divider 41, performs chromatic dispersion compensation for the received optical signal based on the chromatic dispersion compensation amount $D_{CDCM\ \#2}$. Then, the chromatic dispersion compensation unit 40-2 transmits the optical signal subjected to the chromatic dispersion compensation to the optical transmission line 5-2.

The optical fiber transmission paths 51-1 and 51-2 of the optical transmission lines 5-1 and 5-2 respectively transmit the optical signals transmitted from the chromatic dispersion compensation units 40-1 and 40-2 connected thereto, and the optical amplifiers 52-1 and 52-2 respectively amplify the optical signals transmitted from the optical fiber transmission paths 51-1 and 51-2 connected thereto. The optical dividers 53-1 and 53-2 respectively split the optical signals transmitted from the optical amplifiers 52-1 and 52-2 connected thereto into N/2 optical signals, and then transmit the resulting N/2 optical signals to optical fibers leading to the respective optical communication devices 3-1 to 3-N/2 and 3-(N/2+1) to 3-N.

The optical signal reception units 31-1 to 31-N/2 of the respective optical communication devices 3-1 to 3-N/2 receive the optical signals, which have been obtained through splitting by the optical divider 53-1, through the optical fibers. Then, the optical signal reception units 31-1 to 31-N/2 respectively convert the received optical signals into electric signals. Then, the optical signal reception units 31-1 to 31-N/2 respectively output the resulting electric signals to the corresponding electric signal processing units 32-1 to 32-N/2. The electric signal processing units 32-1 to 32-N/2 capture the electric signals, and decode the captured electric signals to restore the transmission data.

The optical signal reception units 31-(N/2+1) to 31-N of the respective optical communication devices 3-(N/2+1) to 3-N receive the optical signals, which have been obtained through splitting by the optical divider 53-2, through the optical fibers. Then, the optical signal reception units 31-(N/2+1) to 31-N respectively convert the received optical signals into electric signals. Then, the optical signal reception units 31-(N/2+1) to 31-N respectively output the resulting electric signals to the corresponding electric signal processing units 32-(N/2+1) to 32-N. The electric signal processing units 32-(N/2+1) to 32-N capture the electric signals, and decode the captured electric signals to restore the transmission data.

In the optical communication system 1a of the aforementioned second embodiment, the chromatic dispersion compensation device 4a includes the optical divider 41 and the chromatic dispersion compensation units 40-1 and 40-2, and the optical divider 41 splits the path connected to the optical communication device 2 into as many paths as the optical transmission lines 5-1 and 5-2. The chromatic dispersion compensation units 40-1 and 40-2 are respectively provided corresponding to the optical transmission lines 5-1 and 5-2. Each of the chromatic dispersion compensation units 40-1 and 40-2 connects one of the paths obtained through splitting by the optical divider 41 and the corresponding optical transmission line 5-1 or 5-2 on a one-to-one basis. The chromatic dispersion compensation unit 40-1 performs compensation based on, as the chromatic dispersion compensation amount, the average value of the amounts of chromatic dispersion generated in the optical signals propagated through the paths leading to the respective optical communication devices 3-1 to 3-N/2 from the optical communication device 2. The chromatic dispersion compensation unit 40-2 performs compensation based on, as the chromatic dispersion compensation amount, the average value of the amounts of chromatic dispersion generated in the optical signals propagated through the paths leading to the respective optical communication devices 3-(N/2+1) to 3-N from the optical communication device 2.

Accordingly, the optical communication devices 3-1 to 3-N/2 can receive the optical signals propagated through the paths leading to the respective optical communication devices 3-1 to 3-N/2 with the amounts $D_1$ to $D_{N/2}$ of chromatic dispersion generated therein compensated for based on the chromatic dispersion compensation amount $D_{CDCM\ \#1}$. The optical communication devices 3-(N/2+1) to 3-N can receive the optical signals propagated through the paths leading to the respective optical communication devices 3-(N/2+1) to 3-N with the amounts $D_{N/2+1}$ to $D_N$ of chromatic dispersion generated therein compensated for based on the chromatic dispersion compensation amount $D_{CDCM\ \#2}$.

In the optical communication system 1a, since the chromatic dispersion compensation device 4a is connected to the optical communication device 2 as the CU, the chromatic dispersion compensation device 4a can be provided around the optical communication device 2, such as in the building of the center station, for example. Therefore, for the optical communication system 1, there is no need to dispatch a person to the positions where the DUs are provided, for performing chromatic dispersion compensation like the optical communication system 100a illustrated in FIG. 11.

With the chromatic dispersion compensation amount setting device 6a, it is possible to, without requiring human labor, set on the chromatic dispersion compensation unit 40-1 the chromatic dispersion compensation amount $D_{CDCM\ \#1}$ corresponding to the N/2 amounts $D_1$ to $D_{N/2}$ of chromatic dispersion generated in the optical signals propagated through the paths leading to the respective optical communication devices 3-1 to 3-N/2 from the optical communication device 2, and also set on the chromatic dispersion compensation unit 40-2 the chromatic dispersion compensation amount $D_{CDCM\ \#2}$ corresponding to the N/2 amounts $D_{N/2+1}$ to $D_N$ of chromatic dispersion generated in the optical signals propagated through the paths leading to the respective optical communication devices 3-(N/2+1) to 3-N from the optical communication device 2.

Since the two chromatic dispersion compensation units 40-1 and 40-2 are used, and not as many chromatic dispersion compensation units 40 as the optical communication devices 3-1 to 3-N are used, chromatic dispersion compensation can be performed with less facilities. Thus, the optical communication system 1a according to the second embodiment can improve signal quality by performing chromatic dispersion compensation while suppressing the cost required for constructing the system, such as the labor cost and the facility cost.

The optical communication system 1a of the second embodiment can, even when there is large variation among the distances between the optical communication device 2 and each of the optical communication devices 3-1 to 3-N, for example, perform chromatic dispersion compensation more appropriately than the optical communication system 1 of the first embodiment. For example, as described above, the distance from the optical communication device 2 is used as the criterion, and the optical communication devices 3-1 to 3-N are divided into groups including a group of the optical communication devices 3-1 to 3-N/2 provided at positions where the distance is less than or equal to the criterion, and a group of the optical communication devices 3-(N/2+1) to 3-N provided at positions where the distance is greater than the criterion. Accordingly, variation among the values of the N/2 chromatic dispersion amounts $D_1$ to $D_{N/2}$ can be reduced, and variation among the values of the N/2 chromatic dispersion amounts $D_{N/2+1}$ to $D_N$ can also be reduced.

Therefore, in comparison with when chromatic dispersion compensation is performed by using a single chromatic dispersion compensation amount $D_{CDCM}$ as with the optical communication system 1 of the first embodiment, it is possible to perform chromatic dispersion compensation more appropriately with the optical communication system 1a of the second embodiment by using the chromatic dispersion compensation amount $D_{CDCM\ \#1}$ corresponding to the chromatic dispersion amounts $D_1$ to $D_{N/2}$ and also using the chromatic dispersion compensation amount $D_{CDCM\ \#2}$ corresponding to the chromatic dispersion amounts $D_{N/2+1}$ to $D_N$.

Since the optical communication system 1a of the aforementioned second embodiment includes the two optical transmission lines 5-1 and 5-2, the distances of the optical fiber transmission paths 51-1 and 51-2 can be set different, for example. Therefore, the optical communication system 1a can be applied to an environment in which the position of the group of the optical communication devices 3-1 to 3-N/2 greatly differs from the position of the group of the optical communication devices 3-(N/2+1) to 3-N, for example.

In the optical communication system 1a of the aforementioned second embodiment, the distance from the optical communication device 2 is used as the criterion for dividing the optical communication devices 3-1 to 3-N into two groups, but the criterion is not limited to the distance from the optical communication device 2, and other parameters may also be used as the criterion.

In the optical communication system 1a of the aforementioned second embodiment, the number of the optical communication devices 3-1 to 3-N in each group is set equal: N/2, but the number of the optical communication devices 3-1 to 3-N included in each group may be set different. It is also possible to divide the optical communication devices 3-1 to 3-N into three or more groups. However, the number of groups should be set less than N to maintain the advantage of multiple access through split fibers such that an optical fiber transmission path is shared for accommodating the plurality of optical communication devices 3-1 to 3-N.

In the aforementioned second embodiment, the chromatic dispersion compensation amount setting device 6a calculates as the chromatic dispersion compensation amount $D_{CDCM\ \#1}$ the average value of the N/2 chromatic dispersion amounts $D_1$ to $D_{N/2}$, and also calculates as the chromatic dispersion compensation amount $D_{CDCM\ \#2}$ the average value of the N/2 chromatic dispersion amounts $D_{N/2+1}$ to $D_N$, for example. In contrast, the chromatic dispersion compensation amount setting device 6a may calculate as the chromatic dispersion compensation amount $D_{CDCM\ \#1}$ or the chromatic dispersion compensation amount $D_{CDCM\ \#2}$ an index value indicating properties other than the average value obtained with the N/2 chromatic dispersion amounts $D_1$ to $D_{N/2}$ or the N/2 chromatic dispersion amounts $D_{N/2+1}$ to $D_N$.

As described above, the chromatic dispersion compensation units 40-1 and 40-2 can suppress degradation of signal quality resulting from chromatic dispersion down to a reference value or less. Thus, the range of the chromatic dispersion that can be compensated for is limited to the range corresponding to the reference value. Therefore, the optical communication device 2 and each of the optical communication devices 3-1 to 3-N should be selected to allow the amount of chromatic dispersion generated between the optical communication device 2 and each of the optical communication devices 3-1 to 3-N/2 to be within the range of the chromatic dispersion compensation amount of the chromatic dispersion compensation unit 40-1 and also allow the amount of chromatic dispersion generated between the optical communication device 2 and each of the optical communication devices 3-(N/2+1) to 3-N to be within the range of the chromatic dispersion compensation amount of the chromatic dispersion compensation unit 40-2.

Third Embodiment

Figure 7:
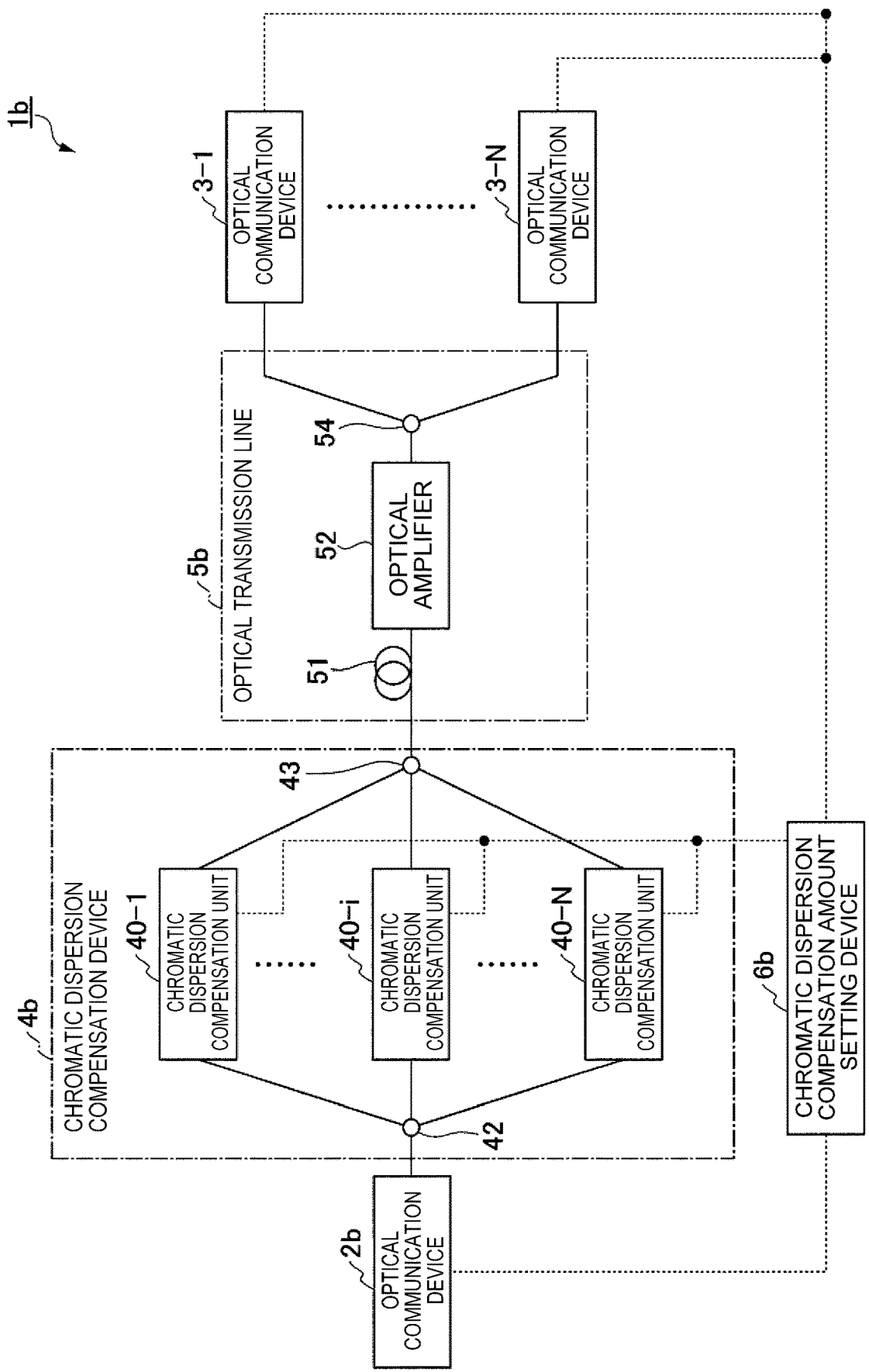
FIG. 7 is a block diagram illustrating the configuration of an optical communication system according to a third embodiment.

FIG. 7 is a block diagram illustrating the configuration of an optical communication system 1b according to a third embodiment. In FIG. 7, configurations identical to those of the first embodiment are denoted by identical reference signs, and different configurations will be described hereinafter. The optical communication system 1b includes an optical communication device 2b, optical communication devices 3-1 to 3-N, a chromatic dispersion compensation device 4b, an optical transmission line 5b, and a chromatic dispersion compensation amount setting device 6b.

In the optical communication system 1a of the second embodiment, the optical communication devices 3-1 to 3-N are divided into two groups, and chromatic dispersion compensation is performed by applying the different chromatic dispersion compensation amounts $D_{CDCM\ \#1}$ and $D_{CDCM\ \#2}$ to the two groups. Accordingly, even when there is large variation among the distances between the optical communication device 2 and the respective optical communication devices 3-1 to 3-N, for example, it is possible to, by dividing the optical communication devices 3-1 to 3-N into two groups based on their distances from the optical communication device 2, for example, perform appropriate chromatic dispersion compensation for each group.

Figure 11:
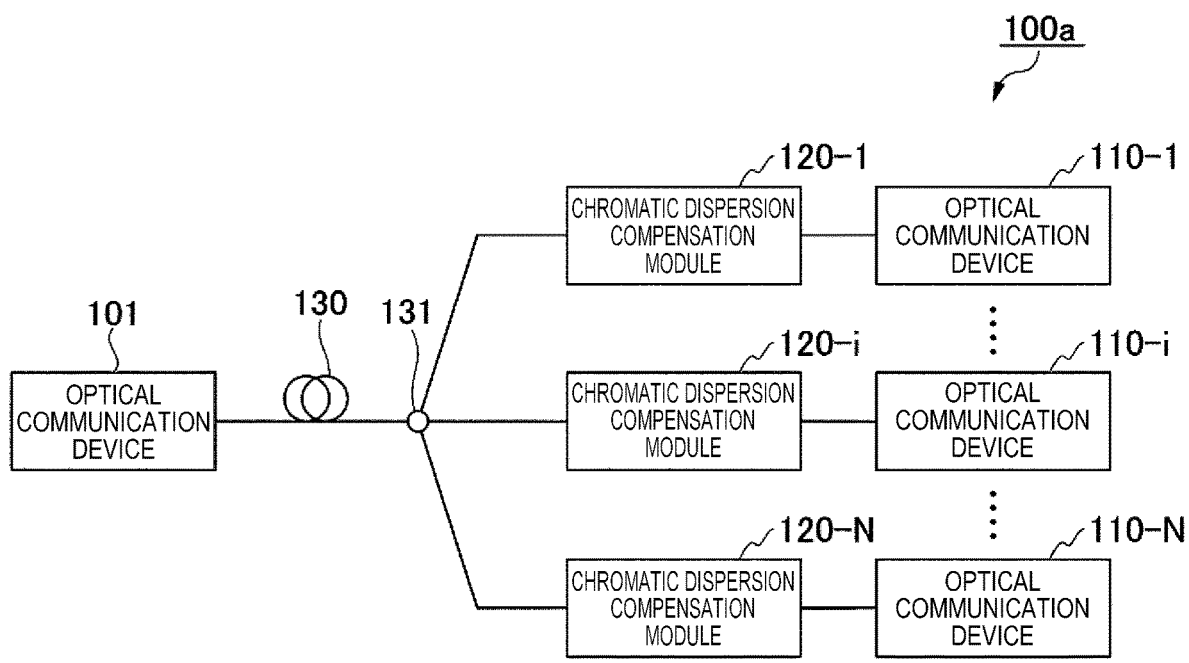
FIG. 11 is a diagram illustrating a means for performing chromatic dispersion compensation in an optical communication system that performs multiple access through split fibers.

In contrast, to perform chromatic dispersion compensation with about the same accuracy as that of the optical communication system 100a illustrated in FIG. 11, it is necessary to individually perform chromatic dispersion compensation for each of the amounts $D_1$ to $D_N$ of chromatic dispersion generated in the optical signals propagated through the paths leading to the respective optical communication devices 3-1 to 3-N. Although it may be effective to divide the optical communication devices 3-1 to 3-N into N groups by expanding the configuration of the optical communication system 1a of the second embodiment, in such a case, N optical transmission lines 5-1 to 5-N are provided. Thus, it would be impossible to take advantage of multiple access through split fibers such that an optical fiber transmission path is shared for accommodating the plurality of optical communication devices 3-1 to 3-N.

In response, the optical communication system 1b of the third embodiment utilizes the wavelength division multiplexing (WDM) technique. Thus, it is possible to individually perform chromatic dispersion compensation for each of the chromatic dispersion amounts $D_1$ to $D_N$ while maintaining the advantage of multiple access through split fibers.

Figure 8:
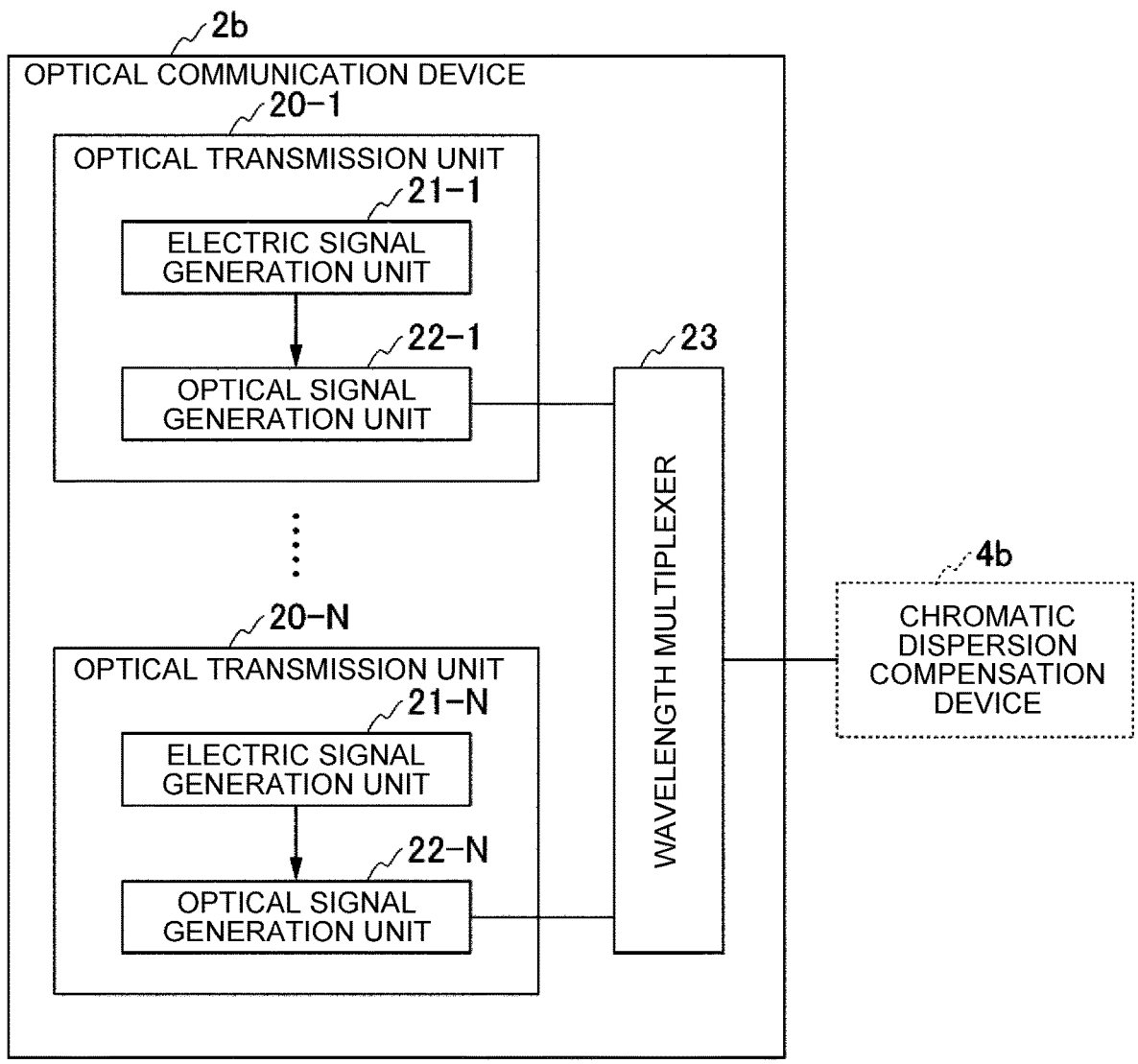
FIG. 8 is a block diagram illustrating the internal configuration of an optical communication device of the third embodiment.

The optical communication device 2b includes N optical transmission units 20-1 to 20-N and a wavelength multiplexer 23 as illustrated in FIG. 8. In the optical communication device 2b, the optical transmission units 20-1 to 20-N respectively include electric signal generation units 21-1 to 21-N and optical signal generation units 22-1 to 22-N. Each of the electric signal generation units 21-1 to 21-N has the same configuration as the electric signal generation unit 21 of the first embodiment, and each of the optical signal generation units 22-1 to 22-N has the same configuration as the optical signal generation unit 22 of the first embodiment.

The wavelength multiplexer 23 is connected to the optical signal generation units 22-1 to 22-N, and converts N optical signals output from the respective optical signal generation units 22-1 to 22-N into optical signals with N different wavelengths. Then, the wavelength multiplexer 23 multiplexes the resulting optical signals with the different wavelengths, and transmits the resulting signal to an optical fiber connected to the chromatic dispersion compensation device 4b.

It should be noted that each of the optical transmission units 20-1 to 20-N of the optical communication device 2b, each of the chromatic dispersion compensation units 40-1 to 40-N of the chromatic dispersion compensation device 4b, and each of the optical communication devices 3-1 to 3-N are associated with one another on a one-to-one basis in advance. Herein, it is assumed that the optical transmission unit 20-n, the chromatic dispersion compensation unit 40-n, and the optical communication device 3-n each having the same branch number "-n" are associated with one another on a one-to-one basis (it should be noted that n=1, 2, . . . , N). In such a case, N different wavelengths are respectively allocated to N combinations including a combination of "the optical transmission unit 20-1, the chromatic dispersion compensation unit 40-1, and the optical communication device 3-1," a combination of "the optical transmission unit 20-2, the chromatic dispersion compensation unit 40-2, and the optical communication device 3-2," . . . , and a combination of "the optical transmission unit 20-N, the chromatic dispersion compensation unit 40-N, and the optical communication device 3-N."

Referring back to FIG. 7, the chromatic dispersion compensation device 4b includes an optical multi/demultiplexer 42, N chromatic dispersion compensation units 40-1 to 40-N, and an optical multi/demultiplexer 43. Each of the optical multi/demultiplexers 42 and 43 is a 1:N WDM coupler, for example, with which an optical signal obtained by multiplexing N wavelengths received at one end thereof is demultiplexed into individual wavelengths, and the resulting N optical signals are respectively propagated through N different paths obtained through splitting and are output from the N other ends as the ends of the N paths. In addition, the optical multi/demultiplexer 42 or 43 multiplexes N optical signals with different wavelengths received at the respective N other ends, and transmits the resulting signal from the one end.

One end of the optical multi/demultiplexer 42 is connected to the optical communication device 2b via an optical fiber, and the N other ends thereof are respectively connected to the chromatic dispersion compensation units 40-1 to 40-N. One end of the optical multi/demultiplexer 43 is connected to the optical fiber transmission path 51 via an optical fiber, and the N other ends thereof are respectively connected to the chromatic dispersion compensation units 40-1 to 40-N.

The chromatic dispersion compensation units 40-1 to 40-N have the same configuration as the chromatic dispersion compensation unit 40 of the first embodiment, and respectively select chromatic dispersion compensation modules corresponding to the chromatic dispersion compensation amounts $D_{CDCM\ \#1}$ to $D_{CDCM\ \#N}$ set thereon by the chromatic dispersion compensation amount setting device 6b, thereby performing chromatic dispersion compensation for optical signals transmitted therethrough.

The optical transmission line 5b includes the optical fiber transmission path 51, an optical amplifier 52, and an optical multi/demultiplexer 54. The optical multi/demultiplexer 54 has a configuration similar to the optical multi/demultiplexers 42 and 43, and a 1:N WDM coupler is applied, for example. One end of the optical multi/demultiplexer 54 is connected to the optical amplifier 52 via an optical fiber, and the N other ends thereof are connected to the respective optical communication devices 3-1 to 3-N.

As described above, the optical transmission unit 20-n, the chromatic dispersion compensation unit 40-n, and the optical communication device 3-n are associated with one another on a one-to-one basis in advance, and the wavelength multiplexer 23 allocates a different wavelength to each combination therewith of the optical transmission unit 20-n, the chromatic dispersion compensation unit 40-n, and the optical communication device 3-n. Thus, it is assumed that the other ends of the optical multi/demultiplexers 42 and 43 are connected to the chromatic dispersion compensation unit 40-1, and the other end of the optical multi/demultiplexer 54 is connected to the optical communication device 3-1 so that an optical signal transmitted from the optical transmission unit 20-n and having a wavelength allocated thereto by the wavelength multiplexer 23 reaches the optical communication device 3-n via the chromatic dispersion compensation unit 40-n.

The chromatic dispersion compensation amount setting device 6b has the same configuration as the first chromatic dispersion compensation amount setting device 6 except for the following point. The first chromatic dispersion compensation amount setting device 6 is connected to the chromatic dispersion compensation unit 40 via a communication line, whereas the chromatic dispersion compensation amount setting device 6b is connected to each of the chromatic dispersion compensation units 40-1 to 40-N via a communication line.

The chromatic dispersion compensation amount setting device 6 of the first embodiment calculates the chromatic dispersion compensation amount $D_{CDCM}$ to be set on the chromatic dispersion compensation unit 40 based on the N calculated chromatic dispersion amounts $D_1$ to $D_N$, and sets the thus calculated chromatic dispersion compensation amount $D_{CDCM}$ on the chromatic dispersion compensation unit 40. In contrast, the chromatic dispersion compensation amount setting device 6b calculates each chromatic dispersion amount $D_n$ corresponding to the optical communication device 3-n as the chromatic dispersion compensation amount $D_{CDCM\ \#n}$, and sets each chromatic dispersion compensation amount $D_{CDCM\ \#n}$ on the corresponding chromatic dispersion compensation unit 40-n.

(Process Performed by Optical Communication System of Third Embodiment)

Figure 9:
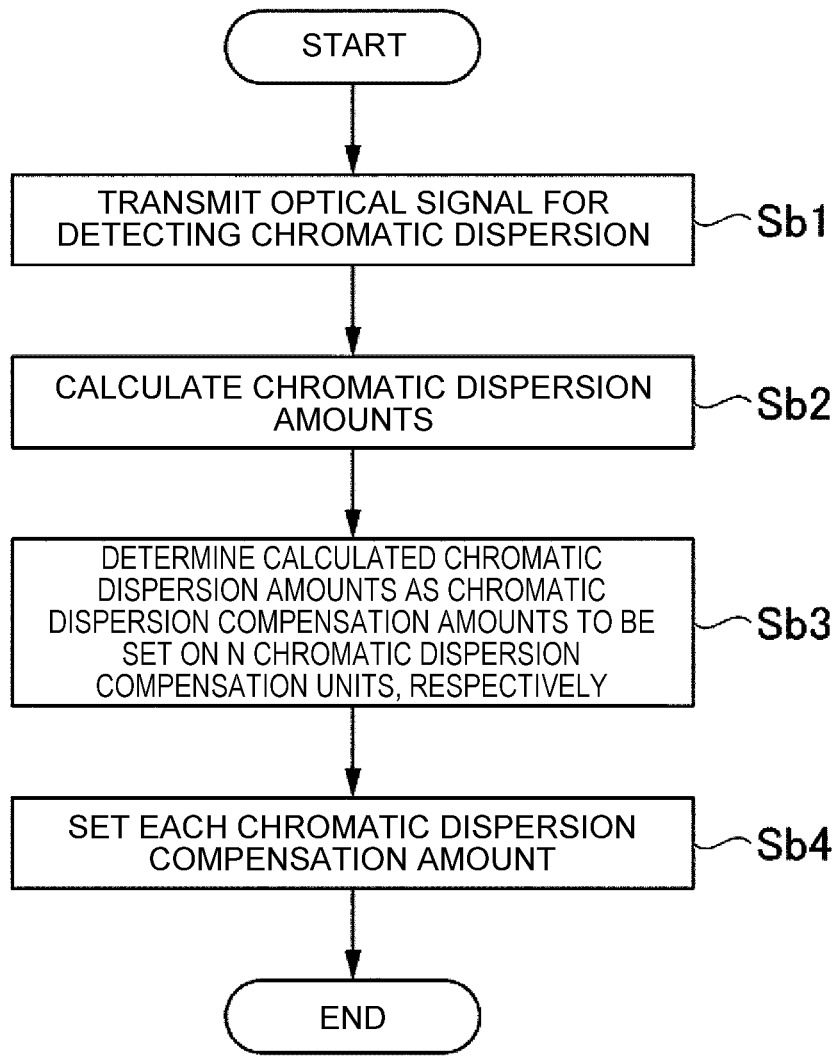
FIG. 9 is a flowchart illustrating a process flow of a chromatic dispersion compensation amount setting device of the third embodiment.
Figure 10:
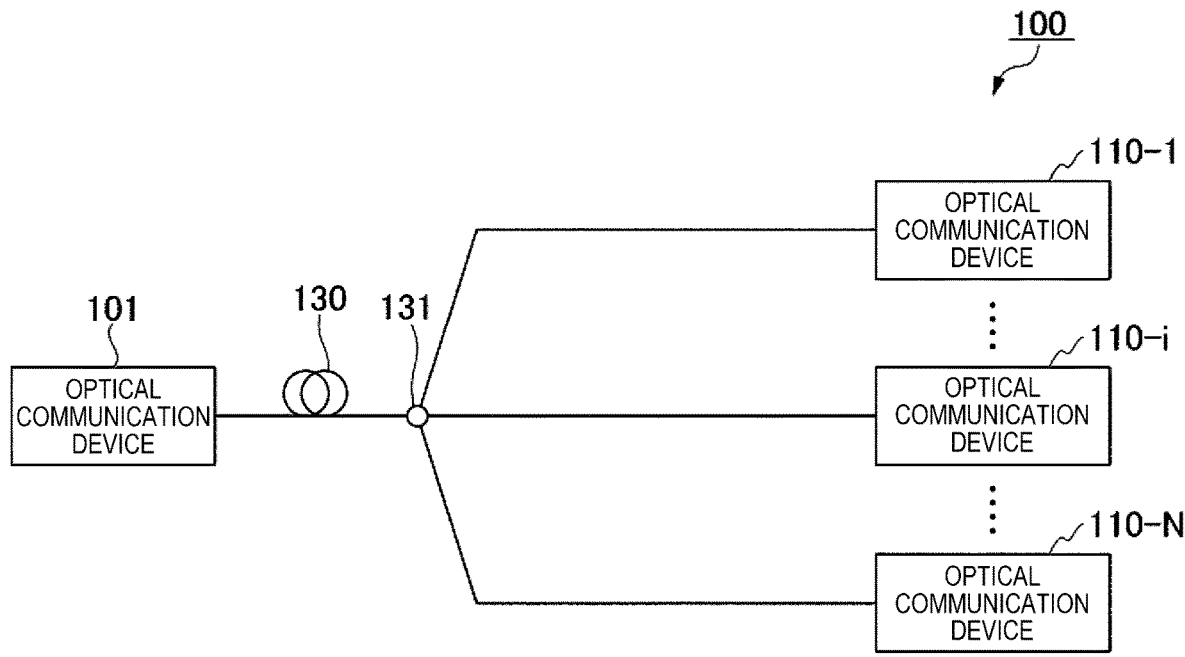
FIG. 10 is a block diagram illustrating an example of an optical communication system that performs multiple access through split fibers.

FIG. 9 is a flowchart illustrating a process flow of the chromatic dispersion compensation amount setting device 6b. In a state where each of the chromatic dispersion compensation units 40-1 to 40-N has no chromatic dispersion compensation amount set thereon, and thus does not perform chromatic dispersion compensation, the chromatic dispersion compensation amount setting device 6b transmits to each of the optical signal generation units 22-1 to 22-N of the optical communication device 2b an instruction signal requesting the transmission of an optical signal for detecting chromatic dispersion (step Sb1).

Upon receiving the instruction signal from the chromatic dispersion compensation amount setting device 6b, each of the optical signal generation units 22-1 to 22-N of the optical communication device 2b generates a predetermined optical signal for detecting chromatic dispersion, and transmits the signal to the wavelength multiplexer 23. The wavelength multiplexer 23 converts N optical signals transmitted from the respective optical signal generation units 22-1 to 22-N into optical signals with N different wavelengths. Then, the wavelength multiplexer 23 multiplexes the resulting optical signals with the different wavelengths, and transmits the resulting signal to the optical fiber.

The optical multi/demultiplexer 42 of the chromatic dispersion compensation device 4b demultiplexes the wavelength-multiplexed optical signal received at one end thereof, which is connected to the optical communication device 2b via the optical fiber, into N wavelengths. Then, the optical multi/demultiplexer 42 transmits the resulting optical signals with the N wavelengths for detecting chromatic dispersion to the respective chromatic dispersion compensation units 40-1 to 40-N.

Since none of the chromatic dispersion compensation units 40-1 to 40-N has the chromatic dispersion compensation amount set thereon by the chromatic dispersion compensation amount setting device 6b, it transmits the optical signal for detecting chromatic dispersion received from the optical multi/demultiplexer 42 as is. The optical multi/demultiplexer 43 multiplexes the optical signals with the N different wavelengths for detecting chromatic dispersion transmitted from the respective chromatic dispersion compensation units 40-1 to 40-N, and transmits the resulting signal to the optical transmission line 5b.

The wavelength-multiplexed optical signal transmitted from the optical multi/demultiplexer 43 reaches the optical multi/demultiplexer 54 via the optical fiber transmission path 51 and the optical amplifier 52. The optical multi/demultiplexer 54 demultiplexes the wavelength-multiplexed optical signal received at one end thereof, which is connected to the optical amplifier 52 via the optical fiber, into N wavelengths. Then, the optical multi/demultiplexer 54 transmits the resulting optical signals with the N different wavelengths for detecting chromatic dispersion from the N other ends thereof, respectively.

The optical signal reception units 31-1 to 31-N of the respective optical communication devices 3-1 to 3-N receive the optical signals transmitted from the N other ends of the optical multi/demultiplexer 54. Then, the electric signal processing units 32-1 to 32-N transmit to the chromatic dispersion compensation amount setting device 6b information on the optical signals received by the respective optical signal reception units 31-1 to 31-N.

The chromatic dispersion compensation amount setting device 6b calculates the amounts $D_1$ to $D_N$ of chromatic dispersion generated in the optical signals propagated through the paths leading to the respective optical communication devices 3-1 to 3-N based on the information on the optical signals received from the respective electric signal processing units 32-1 to 32-N influenced by the chromatic dispersion and the information on the optical signal for detecting chromatic dispersion stored in the internal storage area in advance and not influenced by the chromatic dispersion (step Sb2).

The chromatic dispersion compensation amount setting device 6b determines the calculated chromatic dispersion amounts $D_1$ to $D_N$ as the chromatic dispersion compensation amounts $D_{CDCM\ \#1}$ to $D_{CDCM\ \#N}$, respectively (step Sb3). The chromatic dispersion compensation amount setting device 6b sets the chromatic dispersion compensation amounts $D_{CDCM\ \#1}$ to $D_{CDCM\ \#N}$ on the corresponding chromatic dispersion compensation units 40-1 to 40-N (step Sb4). Then, the chromatic dispersion compensation units 40-1 to 40-N respectively select chromatic dispersion compensation modules corresponding to the chromatic dispersion compensation amounts $D_{CDCM\ \#1}$ to $D_{CDCM\ \#N}$ set thereon by the chromatic dispersion compensation amount setting device 6b, and connect the selected chromatic dispersion compensation modules to the optical communication device 2b and the optical fiber transmission path 51.

In such a state, the optical communication device 2b starts transmission of transmission data to each of the optical communication devices 3-1 to 3-N. It should be noted that the optical communication device 2 of each of the first and second embodiments is configured to transmit identical transmission data to the optical communication devices 3-1 to 3-N as the optical communication device 2 transmits an optical signal with a single wavelength, whereas the optical communication device 2b of the third embodiment differs from each of the first and second embodiments in that the optical communication device 2b can transmit different pieces of transmission data to the optical communication devices 3-1 to 3-N as the optical communication device 2b transmits optical signals with N wavelengths. Therefore, transmission data that is an information source captured by each of the electric signal generation units 21-1 to 21-N of the optical communication device 2b may be either the same or different.

The electric signal generation units 21-1 to 21-N respectively encode the captured transmission data, and convert the encoded transmission data into the waveforms of electric signals, thereby generating electric signals of the transmission data, and then output the generated electric signals to the corresponding optical signal generation units 22-1 to 22-N. The optical signal generation units 22-1 to 22-N respectively convert the electric signals output from the corresponding electric signal generation units 21-1 to 21-N into optical signals. Then, the optical signal generation units 22-1 to 22-N transmit the resulting optical signals to the wavelength multiplexer 23.

The wavelength multiplexer 23 converts the N optical signals transmitted from the respective optical signal generation units 22-1 to 22-N into optical signals with N different wavelengths. Then, the wavelength multiplexer 23 multiplexes the resulting optical signals with the different wavelengths and transmits the resulting signal to an optical fiber.

The optical multi/demultiplexer 42 of the chromatic dispersion compensation device 4b demultiplexes the wavelength-multiplexed optical signal received at one end thereof, which is connected to the optical communication device 2b via the optical fiber, into N wavelengths. Then, the optical multi/demultiplexer 42 transmits the resulting optical signals with the N wavelengths to the respective chromatic dispersion compensation units 40-1 to 40-N.

The chromatic dispersion compensation units 40-1 to 40-N respectively perform chromatic dispersion compensation for the optical signals received from the optical multi/demultiplexer 42 based on the chromatic dispersion compensation amounts $D_{CDCM\#1}$ to $D_{CDCM\#N}$ set thereon. Then, the chromatic dispersion compensation units 40-1 to 40-N respectively transmit the optical signals subjected to the chromatic dispersion compensation to the optical multi/demultiplexer 43. The optical multi/demultiplexer 43 multiplexes the optical signals with the N different wavelengths transmitted from the respective chromatic dispersion compensation units 40-1 to 40-N, and transmits the resulting signal to the optical transmission line 5b.

The optical fiber transmission path 51 of the optical transmission line 5b transmits the optical signal transmitted from the optical multi/demultiplexer 43, and the optical amplifier 52 amplifies the optical signal transmitted from the optical fiber transmission path 51. The optical multi/demultiplexer 54 demultiplexes the wavelength-multiplexed optical signal received at one end thereof, which is connected to the optical amplifier 52 via the optical fiber, into N wavelengths. Then, the optical multi/demultiplexer 54 transmits the resulting optical signals with the N wavelengths from the N other ends thereof.

The optical signal reception units 31-1 to 31-N of the respective optical communication devices 3-1 to 3-N receive the optical signals transmitted from the N other ends of the optical multi/demultiplexer 54. Then, the optical signal reception units 31-1 to 31-N of the respective optical communication devices 3-1 to 3-N convert the received optical signals into electric signals. Then, the optical signal reception units 31-1 to 31-N of the respective optical communication devices 3-1 to 3-N output the resulting electric signals to the corresponding electric signal processing units 32-1 to 32-N. The electric signal processing units 32-1 to 32-N capture the electric signals, and decode the captured electric signals to restore the pieces of transmission data transmitted from the corresponding electric signal generation units 21-1 to 21-N.

In the optical communication system 1b of the third embodiment, the chromatic dispersion compensation device 4b includes the optical multi/demultiplexer 42 connected at one end to the optical communication device 2b, the optical multi/demultiplexer 43 connected at one end to the optical transmission line 5b, and the chromatic dispersion compensation units 40-1 to 40-N connecting the other ends of the optical multi/demultiplexer 42 and the other ends of the optical multi/demultiplexer 43 on a one-to-one basis. The optical multi/demultiplexer 54 is applied as the branch point of the optical transmission line 5b. The different wavelengths, the chromatic dispersion compensation units 40-1 to 40-N, and the optical communication devices 3-1 to 3-N are respectively associated with one another on a one-to-one basis. The chromatic dispersion compensation units 40-1 to 40-N respectively perform compensation based on, as their chromatic dispersion compensation amounts, the amounts of chromatic dispersion generated in the optical signals propagated through the paths between each of the optical communication devices 3-1 to 3-N and the optical communication device 2b.

Accordingly, the optical communication devices 3-1 to 3-N can receive the optical signals propagated through the paths leading to the respective optical communication devices 3-1 to 3-N with the amounts $D_1$ to $D_N$ of chromatic dispersion generated therein compensated for based on their identical amounts $D_{CDCM\#1}$ to $D_{CDCM\#N}$ of chromatic dispersion compensation.

In the optical communication system 1b, since the chromatic dispersion compensation device 4b is connected to the optical communication device 2b as the CU, the chromatic dispersion compensation device 4b can be provided around the optical communication device 2b, such as in the building of the center station, for example. Therefore, for the optical communication system 1, there is no need to dispatch a person to the positions where the DUs are provided, for performing chromatic dispersion compensation like the optical communication system 100a illustrated in FIG. 11.

With the chromatic dispersion compensation amount setting device 6b, it is possible to, without requiring human labor, set on the chromatic dispersion compensation units 40-1 to 40-N the chromatic dispersion compensation amounts $D_{CDCM\#1}$ to $D_{CDCM\#N}$ corresponding to the N amounts $D_1$ to $D_N$ of chromatic dispersion generated in the optical signals propagated through the paths leading to the respective optical communication devices 3-1 to 3-N from the optical communication device 2b. Thus, the optical communication system 1b according to the third embodiment can improve signal quality by performing chromatic dispersion compensation while suppressing the cost required for constructing the system, such as the labor cost.

The optical communication system 1b is configured to individually perform compensation for the amounts $D_1$ to $D_N$ of chromatic dispersion generated in the optical signals propagated through the paths leading to the respective optical communication devices 3-1 to 3-N, using as many chromatic dispersion compensation units 40-1 to 40-N as the optical communication devices 3-1 to 3-N unlike the optical communication systems 1 and 1a of the first and second embodiments. Thus, it is possible to perform chromatic dispersion compensation with higher accuracy than that of each of the optical communication systems 1 and 1a of the first and second embodiments, and perform chromatic dispersion compensation with about the same accuracy as that of the optical communication system 100a illustrated in FIG. 11.

As described above, the chromatic dispersion compensation units 40-1 to 40-N can suppress degradation of signal quality resulting from chromatic dispersion down to a reference value or less. Thus, the range of the chromatic dispersion that can be compensated for is limited to the range corresponding to the reference value. Therefore, the optical communication device 2 and the optical communication devices 3-1 to 3-N should be selected to allow the amounts of chromatic dispersion generated between the respective optical transmission units 20-1 to 20-N of the optical communication device 2b and the corresponding optical communication devices 3-1 to 3-N to be within the range of the chromatic dispersion compensation amounts of the corresponding chromatic dispersion compensation units 40-1 to 40-N.

It should be noted that in the aforementioned first to third embodiments, the optical communication devices 2 and 2b are each configured to perform only the transmission of an optical signal, and the optical communication devices 3-1 to 3-N are each configured to perform only the reception of optical signals, but the present invention is not limited to such embodiments. For example, in each of the optical communication systems 1 and 1a, the optical communication device 2 may include an optical reception unit 30 corresponding to the optical reception unit 30-i illustrated in FIG. 3, and the optical communication devices 3-1 to 3-N may respectively include optical transmission units 20-1 to 20-N corresponding to optical transmission unit 20 illustrated in FIG. 2 so that the optical communication device 2 and the optical communication devices 3-1 to 3-N may exchange optical signals.

In the optical communication system 1b, the optical communication device 2b may include optical reception units 30-1 to 30-N corresponding to the optical reception unit 30-i illustrated in FIG. 3, and the optical communication devices 3-1 to 3-N may respectively include optical transmission units 20-1 to 20-N corresponding to the optical transmission unit 20 illustrated in FIG. 2 so that the optical communication device 2b and the optical communication devices 3-1 to 3-N may exchange optical signals. In such a case, however, the optical transmission units 20-1 to 20-N of the respective optical communication devices 3-1 to 3-N should be configured to generate and transmit optical signals with different wavelengths, and along with this, the optical multi/demultiplexers 42, 43, and 54 should be configured to multiplex or demultiplex the optical signals with different wavelengths transmitted from the respective optical transmission units 20-1 to 20-N.

When the optical communication device 2 or 2b and the optical communication devices 3-1 to 3-N exchange optical signals, the chromatic dispersion compensation amount setting device 6, 6a, or 6b should calculate the amounts of chromatic dispersion generated in optical signals propagated through respective paths in the opposite direction, that is, respective paths leading to the optical communication device 2 or 2b from the optical communication devices 3-1 to 3-N. For example, the chromatic dispersion compensation amount setting device 6, 6a, or 6b may be configured to cause the optical communication devices 3-1 to 3-N to transmit optical signals for detecting chromatic dispersion to the optical communication device 2 or 2b, and cause the electric signal processing units 32, 32-1 to 32-N of the optical communication device 2 or 2b to, upon receiving information on optical signals influenced by chromatic dispersion, calculate N chromatic dispersion amounts in the opposite direction.

It should be noted that when it is considered that identical chromatic dispersion has been generated in both the respective paths leading to the optical communication devices 3-1 to 3-N from the optical communication device 2 or 2b and the respective paths leading to the optical communication device 2 or 2b from the optical communication devices 3-1 to 3-N, it is possible to not calculate the amounts of chromatic dispersion generated in the paths in both the directions but calculate the amounts of chromatic dispersion generated in the paths in one of the directions and use the thus calculated amounts of chromatic dispersion as the amounts of chromatic dispersion generated in the paths in the other direction.

In the aforementioned first and second embodiments, an optical splitter is applied as each of the optical dividers 53, 41, 53-1, and 53-2. Thus, the optical power of an identical optical signal is split, that is, the optical communication device 2 is configured to transmit identical transmission data with a single wavelength to the optical communication devices 3-1 to 3-N, but the configuration of the present invention is not limited to such embodiments. For example, in the case of the optical communication system 1 of the first embodiment, the optical communication device 2b of the third embodiment may be applied instead of the optical communication device 2, and a 1:N optical multi/demultiplexer, specifically, a 1:N WDM coupler may be applied instead of the optical divider 53. In the case of the optical communication system 1a of the second embodiment, the optical communication device 2b of the third embodiment may be applied instead of the optical communication device 2, and a 1:2 optical multi/demultiplexer, specifically, a 1:2 WDM coupler may be applied instead of the optical divider 41, and further, a 1:N/2 optical multi/demultiplexer, specifically, a 1:N/2 WDM coupler may be applied instead of each of the optical dividers 53-1 and 53-2. According to such a configuration, in the first and second embodiments, the optical communication device 2b can transmit different pieces of transmission data to the optical communication devices 3-1 to 3-N.

In each of the aforementioned first to third embodiments, each of the chromatic dispersion compensation units 40 and 40-1 to 40-N of the chromatic dispersion compensation device 4, 4a, or 4b includes a plurality of chromatic dispersion compensation modules in advance, and is configured to select a chromatic dispersion compensation module corresponding to the chromatic dispersion compensation amount set by the chromatic dispersion compensation amount setting device 6, 6a, or 6b. It should be noted that if a variable chromatic dispersion compensation module that can freely change the chromatic dispersion compensation amount becomes available in the future, such a variable chromatic dispersion compensation module can be applied as each of the chromatic dispersion compensation units 40 and 40-1 to 40-N. In addition, it is also possible to use a chromatic dispersion compensation module for which the chromatic dispersion compensation amount is adjusted by a human, as the configuration of the present invention. In such a case, for example, the chromatic dispersion compensation amount setting device 6, 6a, or 6b is provided in a building of a center station in advance, and the administrator of the optical communication system 1, 1a, or 1b adjusts the chromatic dispersion compensation module so as to obtain an appropriate chromatic dispersion compensation amount with reference to the amount of chromatic dispersion generated in each path calculated by the chromatic dispersion compensation amount setting device 6, 6a, or 6b. It should be noted that when the chromatic dispersion compensation amount setting device 6, 6a, or 6b calculates the amount of chromatic dispersion generated in each path, the portions of the chromatic dispersion compensation units 40 and 40-1 to 40-N are directly connected via optical fibers. The administrator inserts the adjusted chromatic dispersion compensation module as each of the chromatic dispersion compensation units 40 and 40-1 to 40-N. When each of the chromatic dispersion compensation units 40 and 40-1 to 40-N is inserted at a position in the building of the center station, the administrator can perform all of the operations in the building of the center station. Therefore, even when a chromatic dispersion compensation module for which the chromatic dispersion compensation amount is adjusted by a human is used in the first to third embodiments, there is no need to dispatch a person to the positions where the DUs are provided. Thus, it is possible to improve signal quality by performing chromatic dispersion compensation while suppressing the cost required for constructing the system, such as the labor cost.

The chromatic dispersion compensation amount setting device 6, 6a, or 6b, the optical communication device 2 or 2b, and the optical communication devices 3-1 to 3-N in each of the aforementioned embodiments may be implemented by a computer. In such a case, the devices may be implemented by recording a program for implementing their functions on a computer-readable recording medium, and causing a computer system to read the program recorded on the recording medium and thus execute the program. It should be noted that the "computer system" herein includes hardware, such as an OS and peripheral devices. In addition, the "computer-readable recording medium" refers to a portable medium, such as a flexible disk, a magneto-optical disk, a ROM, or a CD-ROM, or a storage device, such as a hard disk incorporated in the computer system. Further, the "computer-readable recording medium" may include a medium that dynamically holds a program for a short period of time, such as a communication line when a program is transmitted over a network like the Internet or a communication line like a telephone line, and a medium that holds a program for a given period of time, such as a volatile memory in a computer system that serves as a server or a client in such a case. Furthermore, the aforementioned program may be a program for implementing some of the aforementioned functions, a program that can implement the aforementioned functions in combination with a program already recorded in the computer system, or a program that is implemented using a programmable logic device, such as an FPGA (Field Programmable Gate Array).

Although the embodiments of this invention have been described in detail above with reference to the drawings, the specific configurations are not limited thereto, and designs that are within the spirit and scope of this invention are also included in the invention.

INDUSTRIAL APPLICABILITY

The present invention is applicable to optical fiber communication over a long distance where chromatic dispersion is generated.

REFERENCE SIGNS LIST

1 Optical communication system
2 Optical communication device
3-1 to 3-N Optical communication device
4 Chromatic dispersion compensation device
5 Optical transmission line
6 Chromatic dispersion compensation amount setting device
40 Chromatic dispersion compensation unit
51 Optical fiber transmission path
52 Optical amplifier
53 Optical divider

The invention claimed is:
1. An optical communication system comprising:
a first optical communication apparatus;
a plurality of second optical communication apparatuses arranged at different positions from the first optical communication apparatus and configured to perform communication with the first optical communication apparatus;
a chromatic dispersion compensation apparatus connected to the first optical communication apparatus; and
an optical transmission line connected to the chromatic dispersion compensation apparatus, a path of the optical transmission line connected to the chromatic dispersion compensation apparatus being split into a plurality of paths at a branch point, the resulting paths being respectively connected to the plurality of second optical communication apparatuses, and the optical transmission line being configured to transmit optical signals through the paths,
wherein:
the chromatic dispersion compensation apparatus includes a chromatic dispersion compensator configured to perform chromatic dispersion compensation corresponding to amounts of chromatic dispersion generated in optical signals propagated through respective paths between the first optical communication apparatus and the plurality of second optical communication apparatuses,
wherein the chromatic dispersion compensator selects a chromatic dispersion compensation module corresponding to the chromatic dispersion compensation amount set by a chromatic dispersion compensation amount setting device and connects the selected chromatic dispersion compensation module to the first optical communication apparatus and the optical transmission line, and
wherein the chromatic dispersion compensation amount setting device is configured to calculate, based on optical signals transmitted through the optical transmission line, and then sets the determined chromatic dispersion compensation amount on the chromatic dispersion compensator,
the optical communication system further comprising:
a first optical multi/demultiplexer, a second optical multi/demultiplexer, and a third optical multi/demultiplexer,
wherein:
the optical transmission line includes one optical transmission line,
the chromatic dispersion compensation apparatus includes
the first optical multi/demultiplexer connected at one end to the first optical communication apparatus,
the second optical multi/demultiplexer connected at one end to the optical transmission line, and
the chromatic dispersion compensator including as many chromatic dispersion compensators as the second optical communication apparatuses, each of the chromatic dispersion compensators being configured to connect each of
a plurality of other ends of the first optical multi/demultiplexer and each of the a plurality of other ends of the second optical multi/demultiplexer on a one-to-one basis,
the first optical multi/demultiplexer being configured to demultiplex a wavelength-multiplexed optical signal received at one end into individual wavelengths, output the respective optical signals to the chromatic dispersion compensators from the plurality of other ends, the second optical multi/demultiplexer being configured to multiplex optical signals with different wavelengths received at the respective other ends, and transmit the resulting signal to the optical transmission line from the one end, the third optical multi/demultiplexer is applied as the branch point of the optical transmission line, being configured to demultiplex a wavelength-multiplexed optical signal received at one end into individual wavelengths, output the respective optical signals to the plurality of second optical communication apparatuses from the plurality of other ends, each of the different wavelengths, each of the plurality of chromatic dispersion compensators, and each of the plurality of second optical communication apparatuses are associated with one another on a one-to-one basis, and each of the plurality of chromatic dispersion compensators performs compensation based on, as a chromatic dispersion compensation amount, an amount of chromatic dispersion generated in an optical signal propagated through a path between the corresponding second optical communication apparatus and the first optical communication apparatus.

2. The optical communication system according to claim 1, wherein a DCF or an FBG-DCM is applied as the chromatic dispersion compensator.

3. The optical communication system according to claim 1, further comprising the chromatic dispersion compensation amount setting apparatus configured to calculate, based on optical signals transmitted through the optical transmission line, the amounts of chromatic dispersion generated in the optical signals propagated through the respective paths between the first optical communication apparatus and the plurality of second optical communication apparatuses, and determines a chromatic dispersion compensation amount for the chromatic dispersion compensator based on the calculated amounts of chromatic dispersion, and then sets the determined chromatic dispersion compensation amount on the chromatic dispersion compensator.

4. The optical communication system according to claim 1, wherein:
the first optical communication apparatus performs only transmission of an optical signal, and the second optical communication apparatuses perform only reception of the optical signal transmitted from the first optical communication apparatus, or both the first optical communication apparatus and the second optical communication apparatuses perform transmission and reception of an optical signal.

* * * * *